(12) United States Patent
Kong et al.

(10) Patent No.: US 11,954,844 B2
(45) Date of Patent: Apr. 9, 2024

(54) FATIGUE CRACK DETECTION IN CIVIL INFRASTRUCTURE

(71) Applicant: University of Kansas, Lawrence, KS (US)

(72) Inventors: Xiangxiong Kong, Barrigada, GU (US); Jian Li, Lawrence, KS (US)

(73) Assignee: UNIVERSITY OF KANSAS, Lawrence, KS (US)

( * ) Notice: Subject to any disclaimer, the term of this patent is extended or adjusted under 35 U.S.C. 154(b) by 465 days.

(21) Appl. No.: 17/265,902

(22) PCT Filed: Aug. 20, 2019

(86) PCT No.: PCT/US2019/047272
§ 371 (c)(1),
(2) Date: Feb. 4, 2021

(87) PCT Pub. No.: WO2020/041319
PCT Pub. Date: Feb. 27, 2020

(65) Prior Publication Data
US 2021/0166366 A1  Jun. 3, 2021

Related U.S. Application Data

(60) Provisional application No. 62/720,339, filed on Aug. 21, 2018.

(51) Int. Cl.
*G06T 7/00* (2017.01)
*G06T 5/00* (2006.01)
*G06T 7/33* (2017.01)

(52) U.S. Cl.
CPC .............. *G06T 7/001* (2013.01); *G06T 5/002* (2013.01); *G06T 7/337* (2017.01); *G06T 2207/30136* (2013.01); *G06T 2207/30184* (2013.01)

(58) Field of Classification Search
CPC ......... G06T 7/001; G06T 5/002; G06T 7/337; G06T 2207/30136; G06T 2207/30184;
(Continued)

(56) References Cited

U.S. PATENT DOCUMENTS 5,539,656 A * 7/1996 Annigeri ................. G01N 3/02
73/788
7,697,727 B2 4/2010 Xu et al.
(Continued)

FOREIGN PATENT DOCUMENTS

CN 107145905 A 9/2017
CN 107389732 * 11/2017 ............. G01N 25/72
(Continued)

OTHER PUBLICATIONS

R.S. Adhikari, et al. (2014) "Image-based Retrieval of Concrete Crack Properties for Bridge Inspection," ("the Adhikari article"), (pp. 180-194).
(Continued)

*Primary Examiner* — Jose L Couso
(74) *Attorney, Agent, or Firm* — Thomas | Horstemeyer, LLP

(57) ABSTRACT

An approach for fatigue crack detection is described. In one example, a first image of a structure is captured at a first time, and a second image of the structure is captured at a second time. A feature-based image registration is performed to align features of the second image with the first image, and an intensity-based image registration is performed to further align features of the second image with the first image. A registration error map is determined by performing a pixel-by-pixel intensity comparison of the first image and the second image. Additionally, an edge-aware noise reduction process can be performed on the registration
(Continued)

error map. The registration error map can be referenced to identify certain fatigue cracks in the structure.

20 Claims, 16 Drawing Sheets

(58) Field of Classification Search
CPC .......... G06T 7/33; G06T 2207/20192; G06T 7/0002; G06T 7/0004; G06T 2207/10004; G06T 2207/10016; G06T 2207/30108; G06T 2207/30132; G01N 21/6447; G01N 21/01; G01N 21/88; G01N 21/8851; G01N 29/069; G01N 21/956; G01N 2221/8893; G01N 2203/0064; G01N 2203/0066; G01N 2203/0073; G01N 25/72; G01N 3/068; G01M 5/0008; G01M 5/0033; G01M 5/0091; G01L 5/00
See application file for complete search history.

(56) References Cited

U.S. PATENT DOCUMENTS

| | | | | |
|---|---|---|---|---|
| 8,577,120 | B1* | 11/2013 | Koshti | G06T 7/0004 250/341.8 |
| 8,803,977 | B2 | 4/2014 | Uchima et al. | |
| 9,014,415 | B2 | 4/2015 | Chen et al. | |
| 9,976,968 | B2 | 5/2018 | Ito et al. | |
| 10,576,907 | B2* | 3/2020 | Simula | G01S 17/08 |
| 10,803,613 | B2* | 10/2020 | Porter | G06T 7/0002 |
| 11,657,533 | B2* | 5/2023 | Porter | G06T 7/10 382/103 |
| 2008/0050043 | A1 | 2/2008 | Valadez et al. | |
| 2010/0310128 | A1 | 12/2010 | Iliopoulos et al. | |
| 2012/0033851 | A1* | 2/2012 | Chen | G06T 7/0002 382/100 |
| 2012/0120246 | A1* | 5/2012 | Uchima | G01N 33/42 348/E5.09 |
| 2013/0034305 | A1* | 2/2013 | Jahanshahi | G06V 20/00 382/201 |
| 2013/0245879 | A1* | 9/2013 | Armijo Torres | G01N 19/08 702/34 |
| 2015/0125091 | A1 | 5/2015 | Gallo et al. | |
| 2015/0215584 | A1 | 6/2015 | Tapia et al. | |
| 2016/0133008 | A1* | 5/2016 | Kuratate | G06T 7/12 382/141 |
| 2016/0252464 | A1* | 9/2016 | Ito | G01L 5/00 348/128 |
| 2016/0292518 | A1 | 10/2016 | Banitt et al. | |
| 2017/0038307 | A1* | 2/2017 | Ohta | G01N 21/88 |
| 2017/0103507 | A1* | 4/2017 | Fuchs | H04N 23/90 |
| 2017/0122909 | A1* | 5/2017 | Goroshevskiy | G01M 5/0025 |
| 2017/0343481 | A1* | 11/2017 | Jahanshahi | G06N 20/00 |
| 2017/0350864 | A1* | 12/2017 | Goroshevskiy | G01N 27/82 |
| 2018/0189749 | A1 | 7/2018 | Takamori et al. | |
| 2018/0195973 | A1 | 7/2018 | Yonekawa et al. | |
| 2018/0292328 | A1* | 10/2018 | Karube | G01N 21/8851 |
| 2020/0118263 | A1* | 4/2020 | Nogami | G06V 10/764 |
| 2020/0175352 | A1* | 6/2020 | Cha | G06N 3/04 |

FOREIGN PATENT DOCUMENTS

| | | | | |
|---|---|---|---|---|
| CN | 107389732 | A * | 11/2017 | ............ G01N 25/72 |
| EP | 3096286 | A1 * | 11/2016 | ........... G01M 5/0033 |
| GB | 2057124 | A | 3/1981 | |
| GB | 2542118 | A | 9/2015 | |
| GB | 25421181 | A * | 3/2017 | ............ G06T 7/0002 |
| JP | 4886999 | B2 | 2/2012 | |
| JP | 5221984 | B2 | 6/2013 | |
| KR | 10 1458487 | B1 | 11/2014 | |
| KR | 20160136905 | A | 11/2016 | |
| WO | 0225588 | A3 | 3/2002 | |
| WO | 2016022154 | A1 | 2/2016 | |

OTHER PUBLICATIONS

Abdel-Qader, I., Abudayyeh, O., & Kelly, M. E. (2003). Analysis of edge-detection techniques for crack identification in bridges. Journal of Computing in Civil Engineering, 17(4), (pp. 255-263.).

ASTM International. (2015). "Standard test method for measurement of fracture toughness." ASTM International, (pp. 1-65).

Bay, H., Tuytelaars, T., & Van Gool, L. (May 2006). Surf: Speeded up robust features. In European conference on computer vision (pp. 404-417). Springer Berlin Heidelberg.

Canny, J. (1986). A computational approach to edge detection. IEEE Transactions on pattern analysis and machine Intelligence, (6), (pp. 679-698.).

Cha, Y. J., Choi, W., & Buyukozturk, O. (2017). Deep learning-based crack damage detection using convolutional neural network. Computer-Aided Civil and Infrastructure Engineering, 32(3), 2013-2014. (pp. 361-378).

Chen, F. C., Jahanshahi, M. R., Wu, R. T., & Joffe, C. (2017). A texture-Based Video Processing Methodology Using Bayesian Data Fusion for Autonomous Crack Detection on Metallic Surfaces. Computer-Aided Civil and Infrastructure Engineering, 32(4), (pp. 271-287.).

Chen, J. G., Davis, A., Wadhwa, N., Durand, F., Freeman, W. T., & Büyüköztürk, O. (2016). Video Camera-Based Vibration Measurement for Civil Infrastructure Applications. Journal of Infrastructure Systems, 12 (3), (pp. B4016013:1-B4016013:1-B4016013:11.).

Chen, J. G., Wadhwa, N., Cha, Y. J., Durand, F., Freeman, W. T., & Buyukozturk, O. (2015). Modal identification of simple structures with high-speed video using motion magnification. Journal of Sound and Vibration, 345, (pp. 58-71.).

Coifman, B., Beymer, D., McLauchlan, P., & Malik, J. (1998). A real-time computer vision system for vehicle tracking and traffic surveillance. Transportation Research Part C: Emerging Technologies, 6(4), (pp. 271-288.).

Dias-da-Costa, D., Valença, J., Júlio, E., & Araújo, H. (2016). Crack propagation monitoring using an image deformation approach. Structural Control and Health Monitoring. e1973. doi: 10.1002/stc.1973. (pp. 1-14).

El-Hakim, S. F., Beraldin, J. A., Picard, M., & Godin, G. (2004). Detailed 3D reconstruction of large-scale heritage sites with integrated techniques. IEEE Computer Graphics and Applications, 24(3), (pp. 21-29.).

Feng, D., & Feng, M. Q. (2017). Experimental validation of cost-effective vision-based structural health monitoring. Mechanical Systems and Signal Processing, 88, (pp. 199-211.).

Feng, M. Q., Fukuda, Y., Feng, D., & Mizuta, M. (2015). Nontarget vision sensor for remote measurement of bridge dynamic response. Journal of Bridge Engineering, 20(12), (pp. 04015023:1-04015023:12).

Glišić, B., Yao, Y., Tung, S. T. E., Wagner, S., Sturm, J. C., & Verma, N. (2016). Strain Sensing Sheets for Structural Health Monitoring Based on Large-Area Electronics and Integrated Circuits. Proceedings of the IEEE, 104(8), (pp. 1513-1528.).

Haghani, R., Al-Emrani, M., & Heshmati, M. (2012). Fatigue-prone details in steel bridges. Buildings, 2(4), (pp. 456-476.).

Harris, C., & Stephens, M. (Aug. 1988). A combined corner and edge detector. In Alvey vision conference 15 (50), (pp. 147-151).

Hassel, H. L., Bennett, C. R., Matamoros, A. B., & Rolfe, S. T. (2013). Parametric analysis of cross-frame layout on distortion-induced fatigue in skewed steel bridges. Journal of Bridge Engineering, 18(7), (pp. 601-611.).

Hutt, T., & Cawley, P. (2009). Feasibility of digital image correlation for detection of cracks at fastener holes. NDT & e International, 42(2), (pp. 141-149.).

Ihn JB, and Chang FK. (2004). Detection and monitoring of hidden fatigue crack growth using a built-in piezoelectric sensor/actuator network: I. Diagnostics. Smart materials and structures. 13: (pp. 608-620).

Iyer, S., & Sinha, S. K. (2006). Segmentation of pipe images for crack detection in buried sewers. Computer-Aided Civil and Infrastructure Engineering, 21(6), (pp. 395-410.).

(56) References Cited

OTHER PUBLICATIONS

Jahanshahi, M. R., & Masri, S. F. (2012). Adaptive vision-based crack detection using 3D scene reconstruction for condition assessment of structures. Automation in Construction, 22, (pp. 567-576.).

Kalal, Z., Mikolajczyk, K., & Matas, J. (Aug. 2010). Forward-backward error: Automatic detection of tracking failures. In Pattern recognition (ICPR), 2010 20th international conference on (pp. 2756-2759). IEEE.

Kong, X., Li, J., Bennett, C., Collins, W., & Laflamme, S. (2016). Numerical simulation and experimental validation of a large-area capacitive strain sensor for fatigue crack monitoring. Measurement Science and Technology, 27(12), 124009.

Kong, X., Li, J., Collins, W., Bennett, C., Laflamme, S., & Jo, H. (2017). A large-area strain sensing technology for monitoring fatigue cracks in steel bridges. Smart Materials and Structures, 26(8).

Lowe, D. G. (2004). Distinctive image features from scale-invariant keypoints. International journal of computer vision, 60(2), (pp. 91-110.).

Lucas, Bruce D. and Takeo Kanade (1981). An Iterative Image Registration Technique with an Application to Stereo Vision, Proceedings of the 7th International Joint Conference on Artificial Intelligence, Apr. 1981, (pp. 674-679.).

Man, S. H., & Chang, C. C. (2016). Design and performance tests of a LED-based twodimensional wireless crack propagation sensor. Structural Control and Health Monitoring, 23(4), (pp. 668-683.).

Mokhtari, S., Wu, L., & Yun, H. B. (2017). Statistical Selection and Interpretation of Imagery Features for Computer Vision-Based Pavement Crack-Detection Systems. Journal of Performance of Constructed Facilities, 31(5), 04017054.

Nishikawa, T., Yoshida, J., Sugiyama, T., & Fujino, Y. (2012). Concrete crack detection by multiple sequential image filtering. Computer-Aided Civil and Infrastructure Engineering, 27(1), (pp. 29-47.).

Park, J. W., Lee, J. J., Jung, H. J., & Myung, H. (2010). Vision-based displacement measurement method for high-rise building structures using partitioning approach. NDT & E International, 43(7), (pp. 642-647.).

Polák, I., & Zezulka, P. (2005). Short crack growth and fatigue life in austenitic-ferritic duplex stainless steel. Fatigue & Fracture of Engineering Materials & Structures, 28(10), (pp. 923-935.).

Roberts, T., & Talebzadeh, M. (2003). Acoustic emission monitoring of fatigue crack propagation. Journal of Constructional Steel Research, 59(6), (pp. 695-712.).

Rosten, E., & Drummond, T. (Oct. 2005). Fusing points and lines for high performance tracking. In Tenth IEEE International Conference on Computer Vision (ICCV'05) vol. 1 (vol. 2, pp. 1508-1515). IEEE.

Rupil, J., Roux, S., Hild, F., & Vincent, L. (2011). Fatigue microcrack detection with digital image correlation. The Journal of Strain Analysis for Engineering Design, 46(6) (pp. 1-57).

Saxena, A., & Hudak, S. J. (1978). Review and extension of compliance information for common crack growth specimens. International Journal of Fracture, 14(5), (pp. 453-468.).

Shi, J. (Jun. 1994). Good features to track. In Computer Vision and Pattern Recognition, 1994. Proceedings CVPR'94., 1994 IEEE Computer Society Conference on (pp. 593-600). IEEE.

Sinha, S. N., Frahm, J. M., Pollefeys, M., & Genc, Y. (May 2006). GPU-based video feature tracking and matching. In Edge, Workshop on Edge Computing Using New Commodity Architectures (vol. 278, p. 4321:1-15).

Sobel, I., & Feldman, G. (1973). A 3x3 isotropic gradient operator for image processing. a talk at the Stanford Artificial Project in, 271-272.

Sutton, M. A., Zhao, W., McNeill, S. R., Helm, J. D., Piascik, R. S., & Riddell, W. T. (1999). Local crack closure measurements: Development of a measurement system using computer vision and a far-field microscope. In Advances in fatigue crack closure measurement and analysis: second volume. ASTM International. (pp. 145-156).

Ta, D. N., Chen, W. C., Gelfand, N., & Pulli, K. (Jun. 2009). Surftrac: Efficient tracking and continuous object recognition using local feature descriptors. In Computer Vision and Pattern Recognition, 2009. CVPR 2009. IEEE Conference on (pp. 2937-2944). IEEE.

Tomasi, Carlo and Takeo Kanade (1991). Detection and Tracking of Point Features, Computer Science Department, Carnegie Mellon University, Apr. 1991.

Vanlanduit, S., Vanherzeele, J., Longo, R., & Guillaume, P. (2009). A digital image correlation method for fatigue test experiments. Optics and Lasers in Engineering, 47(3), (pp. 371-378.).

Wahbeh, A. M., Caffrey, J. P., & Masri, S. F. (2003). A vision-based approach for the direct measurement of displacements in vibrating systems. Smart materials and structures, 12(5), (pp. 785-794).

Xu, Y., Li, S., Zhang, D., Jin, Y., Zhang, F., Li, N., & Li, H. (2017). Identification framework for cracks on a steel structure surface by a restricted Boltzmann machines algorithm based on consumer-grade camera images. Structural Control and Health Monitoring. (pp. 1-20).

Yamaguchi, T., Nakamura, S., Saegusa, R., & Hashimoto, S. (2008). Image-Based Crack Detection for Real Concrete Surfaces. IEEJ Transactions on Electrical and Electronic Engineering, 3(1), (pp. 128-135.).

Yang, Y., Dorn, C., Mancini, T., Talken, Z., Kenyon, G., Farrar, C., & Mascareñas, D. (2017). Blind identification of full-field vibration modes from video measurements with phase-based video motion magnification. Mechanical Systems and Signal Processing, 85, (pp. 567-590.).

Yeum, C. M., & Dyke, S. J. (2015). Vision-Based Automated Crack Detection for Bridge Inspection. Computer-Aided Civil and Infrastructure Engineering, 30(10), (pp. 759-770.).

Yoon, H., Elanwar, H., Choi, H., Golparvar-Fard, M., & Spencer, B. F. (2016). Target-free approach for vision-based structural system identification using consumer-grade cameras. Structural Control and Health Monitoring. (pp. 1405-1416).

Zhang, A., Wang, K.C., Li, B., Yang, E., Dai, X., Peng, Y., Fei, Y., Liu, Y., Li, J.Q. and Chen, C. (2017), Automated Pixel-Level Pavement Crack Detection on 3D Asphalt Surfaces Using a Deep-Learning Network. Computer-Aided Civil and Infrastructure Engineering. doi:10.1111/mice.12297 (pp. 805-819).

Zhao Z, & Haldar A. (1996). Bridge fatigue damage evaluation and updating using nondestructive inspections. Engineering fracture mechanics. 53(5), (pp. 775-788).

Zoghlami, I., Faugeras, O., & Deriche, R. (Jun. 1997). Using geometric corners to build a 2D mosaic from a set of images. In Computer Vision and Pattern Recognition, 1997. Proceedings., 1997 IEEE Computer Society Conference on (pp. 420-425). IEEE.

Oberhelman, D. (2015). Road to Growth: The Case for Investing in America's Transportation Infrastructure. Business Roundtable. Retrieved from: http://businessroundtable.org/sites/default/files/2015.09.16%20Infrastructure%20Report%20-%20Final.pdf.

Mahmoud, H. (2017). Upgrading our infrastructure: Targeting repairs for locks, dams and bridges. The Conversation, Mar. 13, 2017.

Lichtenstein, A.G. (1993). The Silver Bridge collapse recounted. Journal of Performance of Constructed Facilities, 7(4), (pp. 249-261).

Fang, Z., Li, A., Li, W., and Shen, S. (2017). Wind-induced fatigue analysis of high-rise steel structures using equivalent structural stress method. Applied Sciences, 7, 71. (pp. 1-18).

Bothma, J.G. (2012). Transmission line tower collapse investigation: a case study. IEEE Power and Energy Society Conference and Exposition in Africa: Intelligent Grid Integration of Renewable Energy Resources (PowerAfrica), Johannesburg, South Africa, Jul. 9-13.

Federal Highway Administration (FHWA). (2004). National bridge inspection standards, Federal Register, 69 (239) (pp. 74420-74439).

Zhao Z, and Haldar A. (1996). Bridge fatigue damage evaluation and updating using nondestructive inspections. Engineering fracture mechanics. 53(5), (pp. 775-788).

Graybeal, B. A., Phares, B. M., Rolander, D. D., Moore, M., & Washer, G. (2002). Visual inspection of highway bridges. Journal of nondestructive evaluation, 21(3), (pp. 67-83.).

(56) References Cited

OTHER PUBLICATIONS

Staszewski, W. J., Lee, B. C., & Traynor, R. (2007). Fatigue crack detection in metallic structures with Lamb waves and 3D laser vibrometry. Measurement Science and Technology, 18(3), (pp. 727-739).

Leong, W. H., Staszewski, W. J., Lee, B. C., & Scarpa, F. (2005). Structural health monitoring using scanning laser vibrometry: III. Lamb waves for fatigue crack detection. Smart Materials and Structures, 14(6), (pp. 1387-1395).

Ihn, J. B., & Chang, F. K. (2004). Detection and monitoring of hidden fatigue crack growth using a built-in piezoelectric sensor/actuator network: I. Diagnostics. Smart materials and structures, 13(3), (pp. 609-620).

Andrade, F. A., Esat, I., & Badi, M. N. M. (2001). A new approach to time-domain vibration condition monitoring: gear tooth fatigue crack detection and identification by the Kolmogorov-Smirnov test. Journal of Sound and vibration, 240(5), (pp. 909-919.).

Blunt, D. M., & Keller, J. A. (2006). Detection of a fatigue crack in a UH-60A planet gear carrier using vibration analysis. Mechanical Systems and Signal Processing, 20(8), (pp. 2095-2111.).

Yao, Y., & Glisic, B. (2015). Detection of steel fatigue cracks with strain sensing sheets based on large area electronics. Sensors, 15(4), (pp. 8088-8108.).

Wu, L., Mokhtari, S., Nazef, A., Nam, B., & Yun, H. B. (2016) "Improvement of crack-detection accuracy using a novel crack defragmentation technique in image-based road assessment". Journal of Computing in Civil Engineering, 30(1), 04014118.

Iyer, S., & Sinha, S. K. (2005). A robust approach for automatic detection and segmentation of cracks in underground pipeline images. Image and Vision Computing, 23(10), (pp. 921-933.).

Cha, Y. J., Choi, W., & Büyüköztürk, O. (2017). Deep Learning-Based Crack Damage Detection Using Convolutional Neural Networks. Computer-Aided Civil and Infrastructure Engineering, 32(5), (pp. 361-378.).

Zhang, L., Yang, F., Zhang, Y. D., & Zhu, Y. J. (Sep. 2016). Road crack detection using deep convolutional neural network. In Image Processing (ICIP), 2016 IEEE International Conference on (pp. 3708-3712). IEEE.

Zhang, A., Wang, K. C., Li, B., Yang, E., Dai, X., Peng, Y., & Chen, C. (2017). Automated Pixel-Level Pavement Crack Detection on 3D Asphalt Surfaces Using a Deep-Learning Network. Computer-Aided Civil and Infrastructure Engineering, 32(10), (pp. 805-819.).

Xu, Y., Bao, Y., Chen, J., Zuo, W., & Li, H. (2018). Surface fatigue crack identification in steel box girder of bridges by a deep fusion convolutional neural network based on consumer-grade camera images. Structural Health Monitoring, vol. 18(3), (pp. 653-674).

Chen, F. C., & Jahanshahi, M. R. (2017). NB-CNN: Deep Learning-based Crack Detection Using Convolutional Neural Network and Naive Bayes Data Fusion. IEEE Transactions on Industrial Electronics. vol. 65(5), (pp. 4392-4400).

Patel, T. H., & Darpe, A. K. (2008). Influence of crack breathing model on nonlinear dynamics of a cracked rotor. Journal of Sound and Vibration, 311(3-5), (pp. 953-972.).

Chondros, T. G., Dimarogonas, A. D., & Yao, J. (2001). Vibration of a beam with a breathing crack. Journal of Sound and vibration, 239(1), (pp. 57-67.).

Polák, J., & Zezulka, P. (2005). Short crack growth and fatigue life in austenitic-ferritic duplex stainless steel. Fatigue & Fracture of Engineering Materials & Structures, 28(10), (pp. 923-935.).

Kong, X., & Li, J. (2018). Vision-Based Fatigue Crack Detection of Steel Structures Using Video Feature Tracking. Computer-Aided Civil and Infrastructure Engineering. In press (33) (pp. 783-799).

Rueckert, D., Sonoda, L. I., Hayes, C., Hill, D. L., Leach, M. O., & Hawkes, D. J. (1999). Nonrigid registration using free-form deformations: application to breast MR images. IEEE transactions on medical imaging, 18(8), (pp. 712-721.).

Bentoutou, Y., Taleb, N., Kpalma, K., & Ronsin, J. (2005). An automatic image registration for applications in remote sensing. IEEE transactions on geoscience and remote sensing, 43(9), (pp. 2127-2137.).

Dwith Chenna, Y. N., Ghassemi, P., Pfefer, T. J., Casamento, J., & Wang, Q. (2018). Free-Form Deformation Approach for Registration of Visible and Infrared Facial Images in Fever Screening. Sensors, 18(1), 125.

Kong, X., & Li, J. (2018). Image registration-based bolt loosening detection of steel joints. Sensors, 18(4), 1000.

Lucas, Bruce D. and Takeo Kanade. An Iterative Image Registration Technique with an Application to Stereo Vision, Proceedings of the 7th International Joint Conference on Artificial Intelligence, Apr. 1981, (pp. 674-679.).

Torr, P. H., & Zisserman, A. MLESAC: A new robust estimator with application to estimating image geometry. Computer Vision and Image Understanding, 1996, 78(1), (pp. 138-156.).

Leutenegger, S., Chli, M., & Siegwart, R. Y. BRISK: Binary robust invariant scalable keypoints. In Computer Vision (ICCV), 2011 IEEE International Conference on (pp. 2548-2555). IEEE. Nov. 2011.

Tareen, S. A. K., & Saleem, Z. (Mar. 2018). A comparative analysis of SIFT, SURF, KAZE, AKAZE, ORB, and BRISK. In Computing, Mathematics and Engineering Technologies (iCoMET), 2018 International Conference on (pp. 1-10). IEEE.

Thirion, J. P. (1998). Image matching as a diffusion process: an analogy with Maxwell's demons. Medical Image Analysis, 2(3), (pp. 243-260.).

Vercauteren, T., Pennec, X., Perchant, A., & Ayache, N. (2009). Diffeomorphic demons: Efficient non-parametric image registration. NeuroImage, 45(1), (pp. S61-S72.).

Zitova, B., & Flusser, J. Image registration methods: a survey. Image and vision computing, 2003, 21(11), (pp. 977-1000.).

Paris, S., Hasinoff, S. W., & Kautz, J. (2011). Local Laplacian filters: Edge-aware image processing with a Laplacian pyramid. ACM Trans. Graph., 30(4), (pp. 68-1-68:11).

Aubry, M., Paris, S., Hasinoff, S. W., Kautz, J., & Durand, F. (2014). Fast local laplacian filters: Theory and applications. ACM Transactions on Graphics (TOG), 33(5), (pp. 167:1-167:14).

Jajich, D., & Schultz, A. E. (2003). Measurement and analysis of distortion-induced fatigue in multigirder steel bridges. Journal of Bridge Engineering, 8(2), (pp. 84-91.).

Canny, J. (1986). A computational approach to edge detection. In Readings in Computer Vision vol. Pami-8 No. 6 (pp. 679-698).

Cha, Y. J., Choi, W., Suh, G., Mahmoudkhani, S., & Büyüköztürk, O. (2018). Autonomous structural visual inspection using region-based deep learning for detecting multiple damage types. Computer-Aided Civil and Infrastructure Engineering, 33(9), (pp. 731-747). https://doi.org/10.1111/mice.12334.

Cha, Y. J., You, K., & Choi, W. (2016). Vision-based detection of loosened bolts using the Hough transform and support vector machines. Automation in Construction, 71, (pp. 181-188.) https://doi.org/10.1016/j.autcon.2016.06.008.

ASTM International. (2015). Standard test method for measurement of fracture toughness. ASTM International. https://doi.org/10.1520/E1820-15A.

Jiang, Y.; Zhang, M.; & Lee, C. H. A study of early stage self-loosening of bolted joints. Journal of Mechanical Design, 2003, 125(3), (pp. 518-526.).

Yang, J., & Chang, F. K. Detection of bolt loosening in C-C composite thermal protection panels: I. Diagnostic principle. Smart Materials and Structures, 2006, 15(2), (pp. 581-590).

Zhao X, Gao H, Zhang G, et al. Active health monitoring of an aircraft wing with embedded piezoelectric sensor/actuator network: I. Defect detection, localization and growth monitoring. Smart Mater Struct 2007; 16(4): (pp. 1208-1217).

Nikravesh, S. M. Y., & Goudarzi, M. A Review Paper on Looseness Detection Methods in Bolted Structures. Latin American Journal of Solids and Structures, 2017, 13. (pp. 2153-2176).

Wu, J., Cui, X., & Xu, Y. A Novel RFID-Based Sensing Method for Low-Cost Bolt Loosening Monitoring. Sensors, 2016, 16(2), 168.

International Search Report and Written Opinion of PCT/US2018/063264 dated Apr. 3, 2019.

International Search Report and Written Opinion of PCT/US2019/023581 dated Jun. 7, 2019.

International Search Report and Written Opinion of PCT/US2019/047272 dated Nov. 15, 2019.

(56) References Cited

OTHER PUBLICATIONS

Khuc, T., & Catbas, F. N. Structural Identification Using Computer Vision-Based Bridge Health Monitoring. Journal of Structural Engineering, 2017, 144(2), (pp. 04017202:1-04017202:13).

Feng, D., & Feng, M. Q. Vision-based multipoint displacement measurement for structural health monitoring. Structural Control and Health Monitoring, 2016, 23(5), (pp. 876-890.).

Abdelbarr, M., Chen, Y. L., Jahanshahi, M. R., Masri, S. F., Shen, W. M., & Qidwai, U. A. 3D dynamic displacement field measurement for structural health monitoring using inexpensive RGB-D based sensor. Smart Materials and Structures, 2017, 26(12), (pp. 125016:1-125016.:23).

Kohut, P., Holak, K., & Martowicz, A. An uncertainty propagation in developed vision based measurement system aided by numerical and experimental tests. Journal of Theoretical and Applied Mechanics, 2012, 50(4), (pp. 1049-1061.).

Yeum, C. M., Dyke, S. J., & Ramirez, J. Visual data classification in post-event building reconnaissance. Engineering Structures, 2018, 155, (pp. 16-24.).

Cha, Y. J., Choi, W., Suh, G., Mahmoudkhani, S., & Büyüköztürk, O. Autonomous Structural Visual Inspection Using Region-Based Deep Learning for Detecting Multiple Damage Types. Computer-Aided Civil and Infrastructure Engineering. 2017 (33) (pp. 731-747).

Kong, X., and Li, J. Vision-based fatigue crack detection of steel structures using video feature tracking. Computer-Aided Civil and Infrastructure Engineering, 2018, In Press. (33) (pp. 783-799).

Yoon, H., Hoskere, V., Park, J. W., & Spencer, B. F. Cross-correlation-based structural system identification using unmanned aerial vehicles. Sensors, 2017, 17(9), 2075.

Kim, H., Lee, J., Ahn, E., Cho, S., Shin, M., & Sim, S. H. Concrete Crack Identification Using a UAV Incorporating Hybrid Image Processing. Sensors, 2017, 17(9), 2052.

Ong, W. H., Chiu, W. K., Kuen, T., & Kodikara, J. Determination of the State of Strain of Large Floating Covers Using Unmanned Aerial Vehicle (UAV) Aided Photogrammetry. Sensors, 2017, 17(8), 1731.

Escobar-Wolf, R., Oommen, T., Brooks, C. N., Dobson, R. J., & Ahlborn, T. M. Unmanned Aerial Vehicle (UAV)-Based Assessment of Concrete Bridge Deck Delamination Using Thermal and Visible Camera Sensors: A Preliminary Analysis. Research in Nondestructive Evaluation, 2017, (pp. 1-16.).

Xu, Y., & Brownjohn, J. M. Review of machine-vision based methodologies for displacement measurement in civil structures. Journal of Civil Structural Health Monitoring, 2017, (pp. 91-110).

Park, J., Kim, T., & Kim, J. Image-based bolt-loosening detection technique of bolt joint in steel bridges. In 6th international conference on advances in experimental structural engineering, University of Illinois, Urbana-Champaign. 2015.

Park, J. H., Huynh, T. C., Choi, S. H., & Kim, J. T. Vision-based technique for bolt-loosening detection in wind turbine tower. Wind and Structures, 2015, 21(6), (pp. 709-726.).

Ramana, L., Choi, W., and Cha, Y. J. Fully automated vision-based loosened bolt detection using the Viola-Jones algorithm, Structural Health Monitoring, 2018, In press. vol. 18(2) (pp. 422-434).

Crum, W. R., Hartkens, T., & Hill, D. L. G. Non-rigid image registration: theory and practice. The British journal of radiology, 77(suppl_2), 2004, (pp. S140-S153.).

Klein, S., Staring, M., Murphy, K., Viergever, M. A., & Pluim, J. P. Elastix: a toolbox for intensity-based medical image registration. IEEE transactions on medical imaging, 2010, 29(1), (pp. 196-205.).

Achanta, R., Shaji, A., Smith, K., Lucchi, A., Fua, P., & Susstrunk, S. SLIC superpixels compared to state-of-the-art superpixel methods. IEEE transactions on pattern analysis and machine intelligence, 2012, 34(11), (pp. 2274-2281.).

Yoon, H., Elanwar, H., Choi, H., Golparvar-Fard, M., & Spencer, B. F. Target-free approach for vision-based structural system identification using consumer-grade cameras. Structural Control and Health Monitoring, 2016, 23(12), (pp. 1405-1416.).

Feng, D., & Feng, M. Q. Computer vision for SHM of civil infrastructure: From dynamic response measurement to damage detection—A review. Engineering Structures, 2018, 156, (pp. 105-117.).

Chen, J. G., Davis, A., Wadhwa, N., Durand, F., Freeman, W. T., & Büyüköztürk, O. Video Camera-Based Vibration Measurement for Civil Infrastructure Applications. Journal of Infrastructure Systems, 2016, 23(3), (pp. B4016013:1-B4016013:11.).

Brownjohn, J. M. W., Xu, Y., & Hester, D. Vision-based bridge deformation monitoring. Frontiers in Built Environment, 2017, 3, 23.

Guo, J. Dynamic displacement measurement of large-scale structures based on the Lucas-Kanade template tracking algorithm. Mechanical Systems and Signal Processing, 2016, 66, (pp. 425-436.).

American Society of Civil Engineers (2017). Infrastructure report card. https://www.infrastructurereportcard.org/.

Chen, W.F and Duan, L. (2014). Bridge Engineering Handbook (2nd Edition): Construction and maintenance. CRC Press, Boca Raton. (pp. A-629) *Separated into 6 separate PDF's due to size*.

Zhao, Y., & Roddis, W. M. K. (2004). Fatigue Prone Steel Bridge Details: Investigation and Recommended Repairs, K-TRAN: KU-99-2, Final Report. Kansas Department of Transportation, Topeka, KS.

McElrath, K. S. (2015). Field, Laboratory, and Analytical Investigation of Angles-with-Plate Retrofit for Distortion-Induced Fatigue in Steel Bridges (Doctoral dissertation, University of Kansas). http://hdl.handle.net/1808/20980 the date of last access: Sep. 1, 2018 (pp. A-345) *Separated into 3 separate documents due to size*.

Okugawa, M. Bolt loosening detection methods by using smart washer adopted 4SID. In Proceedings of the 45th AIAA/ASME/ASCE/AHS/ASC Structures, Structural Dynamics & Materials Conference. Apr. 2004. (pp. 1-12).

Sun, H., Liu, Q., & Fang, L. (2018). Research on Fatigue Crack Growth Detection of M (T) Specimen Based on Image Processing Technology. Journal of Failure Analysis and Prevention, 18(4). https://doi.org/10.1007/s11668-018-0493-6.

* cited by examiner

FATIGUE CRACK DETECTION IN CIVIL INFRASTRUCTURE

CROSS-REFERENCE TO RELATED APPLICATIONS

This application claims the benefit of U.S. Provisional Application No. 62/720,339, filed Aug. 21, 2018, the entire contents of which is hereby incorporated herein by reference.

BACKGROUND

Civil infrastructure, such as buildings, roads, bridges, towers, etc. are susceptible to structural damage and possible failure due to the significant loads that they sustain over long periods of time. In particular, fatigue cracks can be a critical structural concern for steel highway bridges. Caused by the repetitive traffic loads, fatigue cracks are usually small when initiated, making them challenging to be detected at an early stage. However, depending on the structural boundary conditions and layout, fatigue cracks may develop rapidly and significantly impair structural integrity, possibly leading to catastrophic structural failures.

Many existing fatigue crack sensing methods are contact-based, and extensive human operation is necessary for sensor and/or actuator deployment, which may limit their abilities for cost-effective detection of fatigue cracks in a large number of bridges or other civic structures.

Human inspection has been relied upon to visually examine fatigue cracks on steel bridges. However, human inspection is also time consuming, labor intensive, cost inefficient, and prone to error. Although non-destructive testing (NDT) techniques using acoustic emissions and piezoelectric sensors can improve inspection accuracy, they require additional power for generating source signals and increase the complexity of monitoring systems. Strain-based monitoring technologies can also detect fatigue cracks by sensing abrupt strain changes caused by cracking. Nevertheless, the extra work required for the installation of sensors and cabling leads to complex and expensive monitoring systems.

SUMMARY

According to one embodiment, a method for fatigue crack detection is described. The method can include capturing a first image of a structure at a first time, and capturing a second image of the structure at a second time. The method can also include performing a feature-based image registration through a rigid-body transformation to align features of the second image with the first image, and performing an intensity-based image registration through a non-rigid transformation to further align features of the second image with the first image. The method can also include determining a registration error map based on a comparison of the first image and the second image, and performing edge-aware noise reduction on the registration error map. In some cases, the method can also include referencing the registration error map to identify certain fatigue cracks in the structure.

In one example, performing the feature-based image registration can include identifying first features in the first image, identifying second features in the second image, and identifying at least one feature match between the first features and the second features. The feature-based image registration can also include generating a geometric transformation matrix that describes a geometric distortion between the first image and the second image based on the at least one feature match, and aligning the second image with the first image based on the geometric transformation matrix. In another example, performing the intensity-based image registration can include generating at least one displacement field that describes a non-rigid transformation between the first image and the second image, and further aligning the second image with the first image based on the at least one displacement field.

In other aspects, determining the registration error map can include performing a pixel-by-pixel intensity comparison of the first image and the second image. The pixel-by-pixel intensity can include calculating a pixel intensity difference between each pixel in the first image and a corresponding pixel in the second image to generate the registration error map. In one example, in the registration error map, a black pixel can be representative of a zero pixel intensity difference between the pixel in the first image and the corresponding pixel in the second image. Further, in the registration error map, a grey pixel can be representative of a non-zero pixel intensity difference between the pixel in the first image and the corresponding pixel in the second image.

In still other aspects, the method can include conducting a feature enhancement process on the registration error map. The feature enhancement process can include converting the registration error map from a black-white color spectrum to a white-red color spectrum.

According to another embodiment, a system for fatigue crack detection is described. The system can include a memory device configured to store computer-readable instructions and at least one processing device. The processing device can be configured, through execution of the computer-readable instructions, to capture a first image of a structure at a first time, capture a second image of the structure at a second time, and perform a feature-based image registration through a rigid-body transformation to align features of the second image with the first image. The processing device can be further configured to perform an intensity-based image registration through a non-rigid transformation to further align features of the second image with the first image. The processing device can be further configured to determine a registration error map based on a comparison of the first image and the second image, and perform edge-aware noise reduction on the registration error map. Additional aspects of the system are described in detail below.

BRIEF DESCRIPTION OF THE DRAWINGS

For a more complete understanding of the embodiments and the advantages thereof, reference is now made to the following description, in conjunction with the accompanying figures briefly described as follows.

Figure 1:
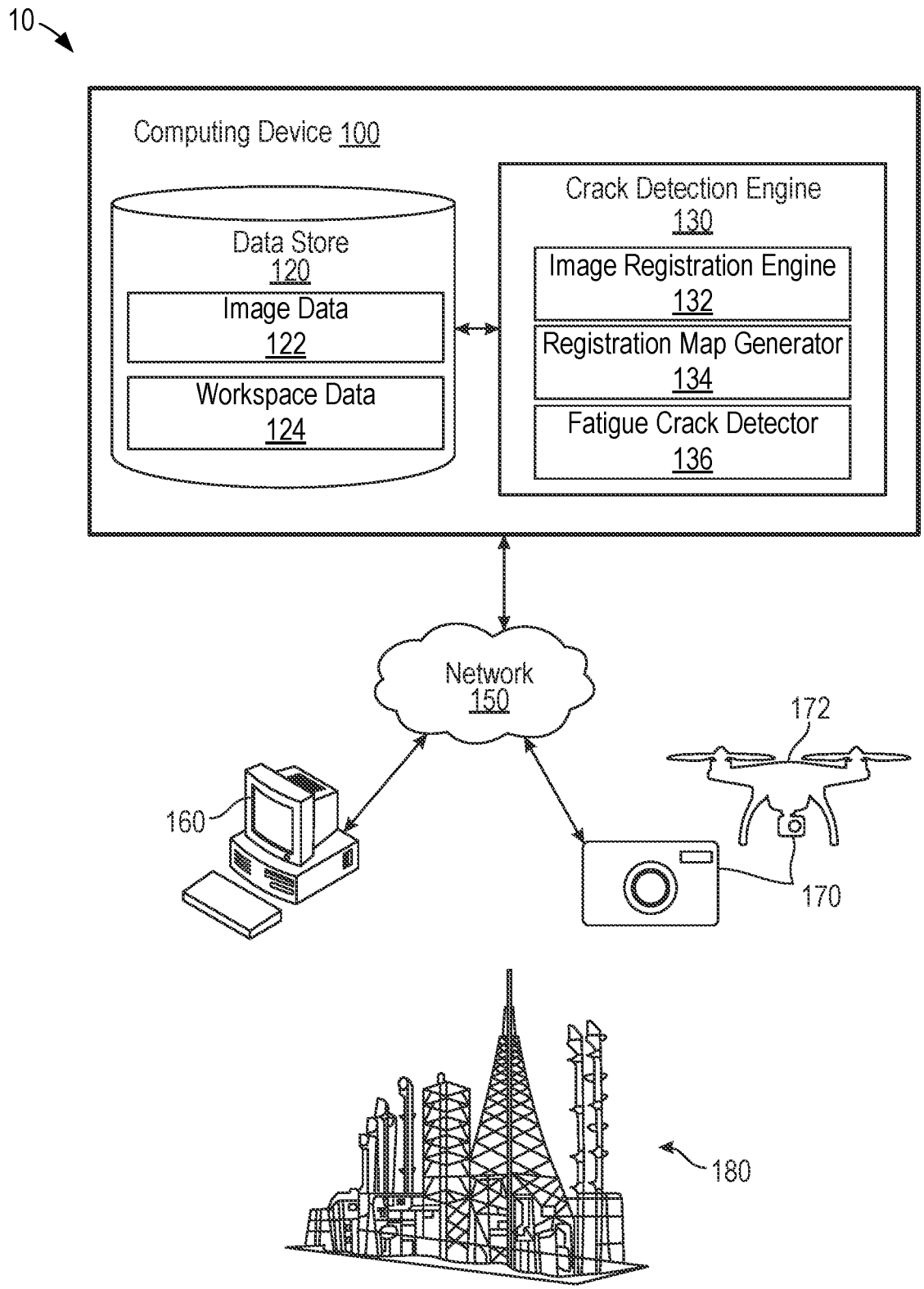
FIG. 1 illustrates a computing environment for fatigue crack detection according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

As noted above, fatigue cracks can be a critical structural concern in steel bridges and other items of infrastructure. Fatigue cracks developed under repetitive loads are one of the major threats to the structural integrity of steel bridges. Fatigue cracks commonly exist in old steel highway bridges in the United States. These fatigue cracks usually grow very slowly, and in many cases, could take decades to grow before they reach critical sizes.

Trained bridge inspectors are relied upon in many cases to visually identify fatigue cracks in steel bridges, typically in two-year inspection intervals. Through regular inspection, crack growth can be recorded so that timely rehabilitation or replacement can be performed. However, human inspection is labor intensive and prone to error due to the relatively small size of fatigue cracks, particularly in early stages, and the relatively low contrast between the cracks and adjacent metallic surfaces. One study demonstrated that, based on a welded plate girder bridge built in 1970s, only 2% to 7% of the inspectors could correctly identify fatigue cracks in the bridge.

Some fatigue crack sensing methods are contact-based, but extensive human operation is necessary for sensor and/or actuator deployment. Contact-based sensing technologies can be used for detecting and/or monitoring fatigue cracks, including those that provide enhanced accuracy and robustness in crack detection. Examples of these technologies include the use of ultrasonic guided waves, piezoelectric sensors, vibration analysis, and large area electronics. A general limitation of these contact-based approaches, however, is that extensive human operation is necessary for sensor and/or actuator deployment. Therefore, monitoring large-scale civil structures for fatigue cracks is not easily achievable using contact-based sensing technologies in a cost-effective manner.

Computer-vision-based crack detection methods have shown potential as contactless, easy-to-deploy, and lower-cost detection methods. Some computer-vision-based image processing techniques (IPTs) can efficiently search for and identify localized edge features of cracks in images. IPT-based methods include edge detection, image segmentation, percolation processing, sequential image filtering, and others processes. However, these methods mainly rely on finding the edge features of cracks, and it can be challenging for them to distinguish true cracks from crack-like edges such as structural boundaries, wires, or corrosion marks.

Certain IPT-based methods have been developed for extracting additional features of cracks beyond edge features. For example, a statistical approach was proposed based on multiple features of cracks including crack length, width, and orientation, enabling a more robust identification of pavement cracks. Another approach applied a three-dimensional (3D) reconstruction technology to create a 3D point cloud of a concrete crack to extract the crack penetration depth. Still another approach proposed learning the invariant features from a large volume of images using deep learning technologies to achieve robust crack detection on concrete components in various lighting conditions. Similar deep-learning based approaches have been reported to detect cracks on a steel box girder and asphalt surfaces. Nevertheless, false positive results can still occur using these advanced methods.

A common aspect of many IPT-based methods is that only static features are utilized in crack detection. For infrastructure under service loads, the existence of a crack opening on a structural surface can create discontinuities in the pattern of surface motion (e.g., a crack that moves perpendicularly to the crack length direction). Tracking the surface motion and analyzing the pattern to uncover such discontinuities is a potential approach to detect and quantify cracks with high accuracy. This concept has been applied with Digital Image Correlation (DIC) technologies for crack detection by tracking the discontinuity of certain displacements. However, these methods require expensive equipment, such as macro lenses, microscopes, special light sources, or surface treatments.

Relying on consumer-grade digital cameras and a variety of vision sensing algorithms, vision-based non-contact sensing technologies can be used to rapidly scan large structural surfaces for structural heath. In particular, crack detection can be performed in different types of civil infrastructure such as concrete structures, roads, and pipelines. However, high false positive detection rates may become critical concerns for these methods, particularly when cracks are surrounded by non-crack features (e.g. wires, structural boundary lines, corrosion marks, etc.). Further, existing methods may not perform well for detecting fatigue cracks in metallic structures, as fatigue cracks are hardly discernible due to their extremely low contrast against adjacent structural surfaces.

Another approach is to use machine learning or deep learning algorithms to explore discriminative and representative features of the cracks. In the context of metallic crack detection for civil infrastructure, local binary patterns (LBP), support vector machine (SVM), and Bayesian decision theory can be integrated to achieve a robust sensing algorithm that is able to more efficiently distinguish true cracks on metallic surfaces from other non-crack edges such as scratches, welds, and grind marks. Deep fusion convolutional neural networks (FCNN)-based methods have been used to identify fatigue cracks from images in a steel box girder bridge, for example.

One of the advantages of these approaches is that the reliability of crack detection is significantly enhanced even when the true crack is surrounded by other non-crack edges. Nevertheless, training machine learning-based algorithms can be computationally expensive and require intensive labor. For example, in one study, 67,200 image patches were manually labeled into three categories, including crack, handwriting, and background. This procedure would have to be repeated in cases of detecting fatigue cracks in different types of steel bridges.

One commonality among the above-described methods is that cracks are examined only under static conditions. However, fatigue cracks in civil infrastructure are often subject to small cyclic movements perpendicular to the crack path under repetitive service loads. Such dynamic movements are typically associated with the opening and closing of cracks, also termed crack breathing, and may offer more robust strategies for crack identification. For example, crack breathing in a rotor induces non-linear dynamic behavior that can serve as a basis for crack detection. Similarly, the crack breathing behavior of a support beam can be relied upon to identify a crack in the support beam based on the natural frequency of the crack breathing.

Crack breathing can also offer opportunities for improving vision-based fatigue crack detection. For instance, digital image correlation (DIC) technologies have been applied for fatigue crack detection by tracking the discontinuous displacement field caused by crack breathing. Despite their high detection accuracies, DIC-based approaches usually require expensive equipment (e.g., macro lenses, microscopes, and special light sources) or surface treatments. These requirements generally limit their cost-effectiveness for sensing fatigue cracks in civil infrastructure.

To address the aforementioned challenges, a vision-based non-contact approach is described herein to detect fatigue cracks through image overlapping. Small cyclic movements of cracks perpendicular to the crack path under repetitive fatigue load (e.g., crack breathing) can be relied upon as a robust indicator for crack identification. The differential image features provoked by a breathing crack can be extracted, enhanced, and visualized through the series of image processing techniques described herein. The performance of the proposed approach has been experimentally validated through laboratory setups including a small-scale steel compact specimen and a large-scale bridge to cross-frame connection specimen. The test results demonstrate that the proposed approach can reliably identify fatigue cracks, even when the fatigue crack is surrounded by other non-crack features. In some embodiments, the proposed methods can be integrated with unmanned aerial vehicles (UAVs) for achieving autonomous fatigue crack inspection of civil infrastructure.

The image overlapping processes described herein can reliably identify fatigue cracks among images or frames of a video stream even when the crack is surrounded by non-crack surface features or is invisible to human eyes upon crack closure. Through image registration techniques, two images captured at different times (and even at different camera positions) can be aligned into the same coordinate system, such that differential image features provoked by a breathing crack can be identified. Various image overlapping strategies have been applied in cancer detection, remote sensing, and human fever screening. Nevertheless, limited research about image overlapping technologies has been performed for crack detection in civil infrastructure, especially fatigue crack detection in metallic structures.

The image overlapping processes described herein can offer a low-cost and flexible fatigue crack detection approach. Compared with edge-detection-based crack detection methods, the image overlapping processes can yield more robust detection results even when a fatigue crack is surrounded by other non-crack edges. Compared with machine learning-based crack detection methods, the image overlapping processes do not require prior knowledge about the damage status of the monitored structure for training the classifier.

Compared with DIC-based crack detection technologies, the image overlapping processes demonstrate significant flexibilities and potential for field applications. The image overlapping processes can be accomplished using a consumer-grade digital camera and do not require special lighting or surface treatment. The image overlapping processes even show higher precision for crack localization than video feature tracking. Importantly, instead of relying on a fixed camera, image collection in the image overlapping processes described herein can be performed through a hand-held camera under different camera poses or positions. The use of unfixed cameras in the image overlapping processes offers the potential of integration with unmanned aerial vehicles (UAVs) for achieving autonomous fatigue crack inspection of civil infrastructure.

Turning to the figures, FIG. 1 illustrates a computing environment 10 for fatigue crack detection according to various embodiments of the present disclosure. The computing environment 10 is provided as a representative example of one environment for computer-vision-based fatigue crack detection, but other components can perform the functions described below. The computing environment 10 includes a computing device 100, a network 150, a client device 160, an image capture device 170, a UAV 172. The civil infrastructure 180 can be evaluated for fatigue cracks by the computing environment 10 as described herein. As shown in FIG. 1, the image capture device 170 can be positioned to capture a sequence of images and/or video of the civil infrastructure 180, such as buildings, roads, bridges, towers, etc., for the purpose of computer-vision-based fatigue crack detection as described herein.

The computing device 100 can be embodied as one or more desktop or server computers, computing devices, or computing systems. In certain embodiments, the computing device 100 can include one or more computing devices arranged, for example, in one or more server or computer banks. The computing device 100 can be located at a single installation site or distributed among different geographical locations. The computing device 100 can include a plurality of computing devices that together embody a hosted computing resource, a grid computing resource, or other distributed computing arrangement. In some cases, the computing device 100 can be embodied as an elastic computing resource where an allotted capacity of processing, network, storage, or other computing-related resources varies over time. As further described below, the computing device 100 can also be embodied, in part, as certain functional or logical (e.g., computer-readable instruction) elements or modules as described herein.

Among other components, the computing device 100 includes a data store 120 and a crack detection engine 130. The crack detection engine 130 includes an image registration engine 132, a registration map generator 134, and a fatigue crack detector 136. The data store 120 includes an area in memory for the storage of image data 122 and for the storage of workspace data 124. The image data 122 can include one or more images or videos of the civil infrastructure 180, under analysis by the crack detection engine 130. The image data 122 can include any number of images or videos of the civil infrastructure 180, captured at any suitable resolution, frame rate, etc. by any suitable imaging device or camera, including the image capture device 170. The workspace data 124 includes a scratchpad or working memory area for the crack detection engine 130. As examples, the crack detection engine 130 can store data related to one or more ROIs, feature points, the movement or displacement of feature points in the image data 122, and other data for processing in the workspace data 124. The operations of the crack detection engine 130 are described in further detail below.

The network 150 can include the Internet, intranets, extranets, wide area networks (WANs), local area networks (LANs), wired networks, wireless networks, cable networks, satellite networks, other suitable networks, or any combinations thereof. As one example of the network 150, the computing device 100, the client devices 160, and the image capture devices 20 can be communicatively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

The client device 160 is representative of one or more client devices. The client device 160 can be embodied as any computing devices, processing circuits, or processor based devices or systems, including those in the form of desktop computers, laptop computers, tablet computers, personal digital assistants, cellular telephones, or wearable computing devices, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

The client device 160 can be relied upon to interface with the computing device 100. The client device 160 can interface with the computing device 100 to review the analysis performed by the crack detection engine 130 and the data stored in the data store 120. In some cases, the data store 120 and the crack detection engine 130 can be implemented in the client device 160, and the computing device 100 can be omitted.

The image capture device 170 can be embodied as one or more image or video cameras capable of capturing a sequence of images or videos at any suitable frame rate and resolution. The image capture device 170 can be professional- or commercial-grade device including one or more image sensors, lenses, image processors, memory devices, illumination sources, and other components. The image capture device 170 can be a standalone image capture device or incorporated into other devices, such as in cellular telephones, laptops, media players, and other devices.

In testing the processes described herein, a Nikon® D7100 camera with a Sigma® 17-50 mm lens were used in auto shooting mode, although the processes can be performed with images captured by other imaging devices. A typical distance of about 20 cm was relied upon between the camera and the monitored structure, although a different distance can be used. A larger distance could be feasible if a higher resolution camera is applied. The camera can be held by hands during image acquisitions or stationary. Ambient lighting conditions are generally acceptable. Camera calibration is not required.

Images captured by the image capture device 170 can be transferred to the computing device 100 over the network 150, using a local wired connection, by hand transfer using a memory stick or device (e.g., a flash-based memory stick or card), or any other suitable means or method. The images captured by the image capture device 170 can be stored locally by the computing device 100 as the image data 122 for further processing.

When capturing images and videos, the image capture device 170 can be handheld or mounted to one or more frames or stands, such as monopods, bipods, tripods, or other stands, and directed (i.e., pointed) to capture videos of the civil infrastructure 180. The image capture device 170 can be mounted to the civil infrastructure 180 itself or separated from the civil infrastructure 180 by some distance. The distance between the image capture device 170 and the civil infrastructure 180 can vary based on certain factors, such as the resolution of the image sensors in the image capture device 170, the focal length of any lenses of the image capture device 170, the amount of available light, and other factors. In some cases, the image capture device 170 can include a number of image capture devices used together to capture images or videos of different regions or areas of the civil infrastructure 180 for analysis. Additionally, the image capture device 170 can be mounted to a UAV, such as the UAV 172. UAVs can be relied upon to position the image capture device 170 for additional flexibility in capturing images or videos of the civil infrastructure 180 at hard-to-reach locations or locations obscured from view from the ground.

Referring back to the computing device 100, the crack detection engine 130 is configured to detect fatigue cracks through image overlapping. As noted above, the crack detection engine 130 includes the image registration engine 132, the registration map generator 134, and the fatigue crack detector 136. Once at least two images (e.g., first and second images taken at different times) of the infrastructure 180 are captured by the image capture device 170 and stored in the image data 122, the crack detection engine 130 can perform a number of image processing steps on the images to detect fatigue cracks in the infrastructure 180. The image processing steps are relied upon to identify movements of cracks in the images, such as movements perpendicular to the crack path under repetitive fatigue load (e.g., crack breathing) as a robust indicator for crack identification. Various examples of the image processing steps are described below. The image processing steps can result in the creation of new images, the modification of existing images, or a combination of both the creation of new images and the modification of existing images depending upon the manner of implementation.

Acting on two or more images captured by the image capture device 170 at different times, the image registration engine 132 is configured to identify and align various features of the images. As an example, suppose a beam is subject to a fatigue crack under a repetitive fatigue load F. The beam is under a lower fatigue load $F_1$ at a first moment in time and under a higher fatigue load $F_2$ at a second moment in time. The fatigue load F (and the difference between $F_1$ and $F_2$) will induce a breathing behavior in the fatigue crack in the beam. Specifically, the opening of the fatigue crack changes under different levels of fatigue loading.

Figure 2:
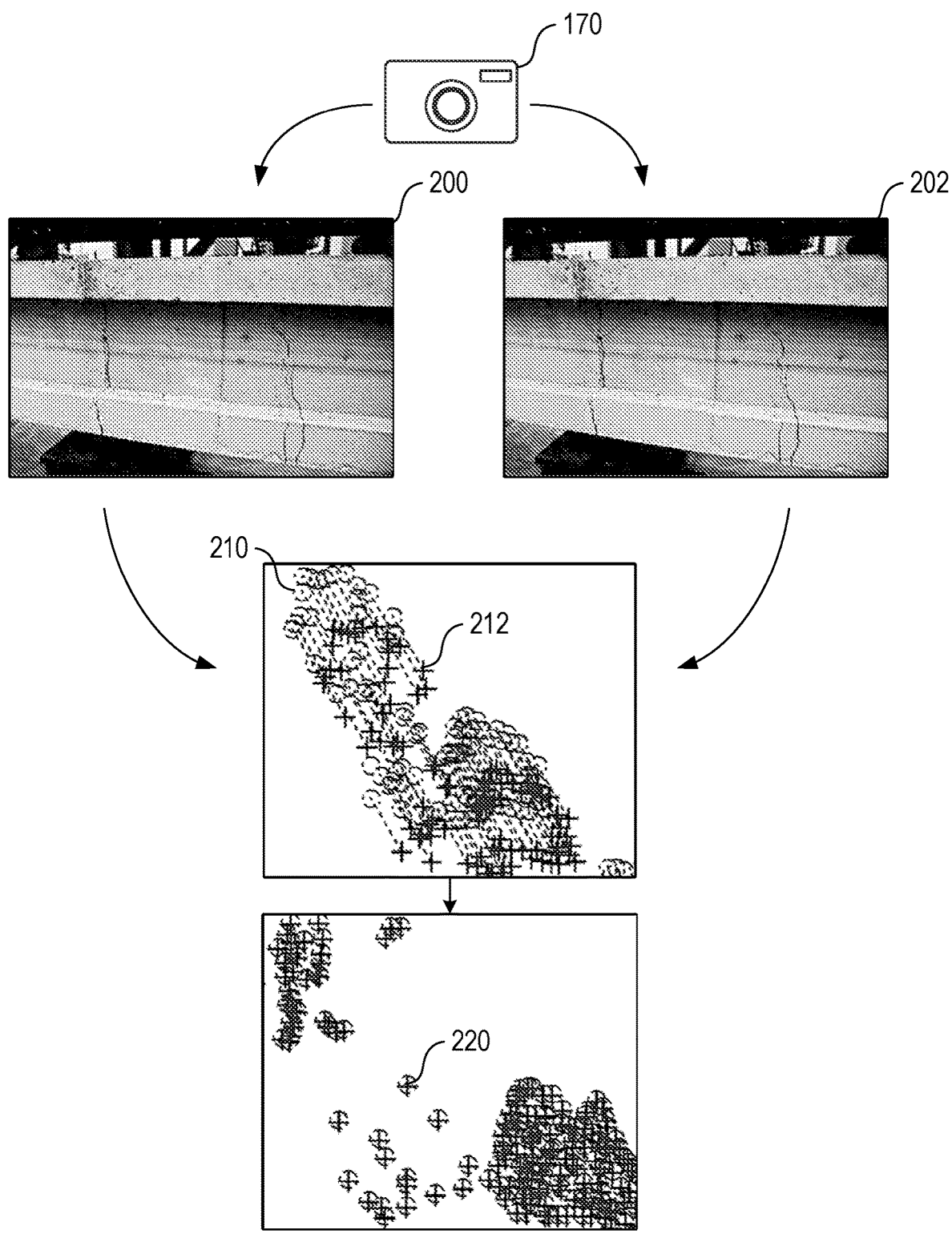
FIG. 2 illustrates an example of the breathing behavior of a fatigue crack and feature-based image registration according to various embodiments of the present disclosure.

FIG. 2 illustrates an example of the breathing behavior of a fatigue crack in an example concrete girder. The image capture device 170, such as a hand-held camera, can be used to take two images 200 and 202 of the concrete girder under different fatigue loads $F_1$ and $F_2$ (and at different times), such that a fatigue crack in the concrete girder exhibits different openings or sizes in the two images 200 and 202. Because the image capture device 170 can be an unfixed camera, the relative poses or orientations of the two images 200 and 202 may be different. Thus, directly overlapping the two images 200 and 202 to identify a difference in the size of the fatigue crack between them may not yield a satisfactory result.

Thus, to achieve robust crack detection, the image registration engine 132 can perform two image registration processes, including feature-based image registration and intensity-based image registration, starting with the images 200 and 202. Successive application of the two image registration processes allows misalignment between the images 200 and 202 to be gradually reduced. The image registration processes ultimately align the image 202, for example, to the same coordinate system as the image 200. In general, image registration includes transforming different sets of data into one coordinate system. Image registration or alignment processes can be classified into feature-based and intensity-based algorithms. Among two images used in an image registration process, one image can be referred to as the moving image and the other image can be referred to as the target or fixed image. Image registration involves spatially transforming the moving image to align it with the target image based on the correspondence of certain features in the images. Intensity-based methods compare intensity patterns in images via correlation metrics, while feature-based methods find correspondence between image features such as points, lines, and contours.

First, the image registration engine 132 is configured to perform a feature-based image registration through a rigid-body transformation, to align features of the image 202 with features of the image 200. The image registration engine 132 can perform a feature detection algorithm, such as the Shi-Tomasi feature detection algorithm, to detect one or more features 210 (e.g., identified as circles) in the image 200 and one or more features 212 (e.g., identified as pluses) in the image 202. The features 210 and 212 can be identified based on unique intensity changes in localized regions, in both horizontal and vertical directions, in the images 200 and 202.

Next, the image registration engine 132 can perform a feature tracking algorithm to identify certain features 210 that match with respective features 212. For example, the image registration engine 132 can perform the Kanade-Lucas-Tomasi (KLT) tracker algorithm find correspondences between the features 210 and 212. Matches are shown in FIG. 2 by the dashed lines between the circles and the pluses. Referring to the matches between the features 210 and 212, the image registration engine 132 can also perform the maximum likelihood estimation sample consensus (MLESAC) algorithm, or another suitable algorithm, to estimate a projective geometric transformation matrix between the images 200 and 202. The geometric transformation matrix describes the geometric distortion between the images 200 and 202. Based on the transformation matrix, the image 202 can be registered to the image 200, so that the images 200 and 202 share the same coordinate system. This alignment can is shown in the matched features 220 between the images 200 and 202, as shown in FIG. 2.

The feature-based image registration can be flexible in terms of implementation. For instance, instead of Shi-Tomasi features, other types of features could also serve as correspondences for feature matching. As an example, accelerated segment test (FAST), Harris-Stephens, Binary robust invariant scalable keypoints (BRISK), and speeded up robust features (SURF) can be used to detect scale invariant features for aligning two the images 200 and 202. In addition, the tracking algorithm is not tied to a particular type of features. Besides Shi-Tomasi features and the KLT tracker, other combinations can also be utilized. Examples include Harris-Stephens features associated with the KLT tracker and SIFT features associated with the descriptor vectors-based tracker.

Figure 3:
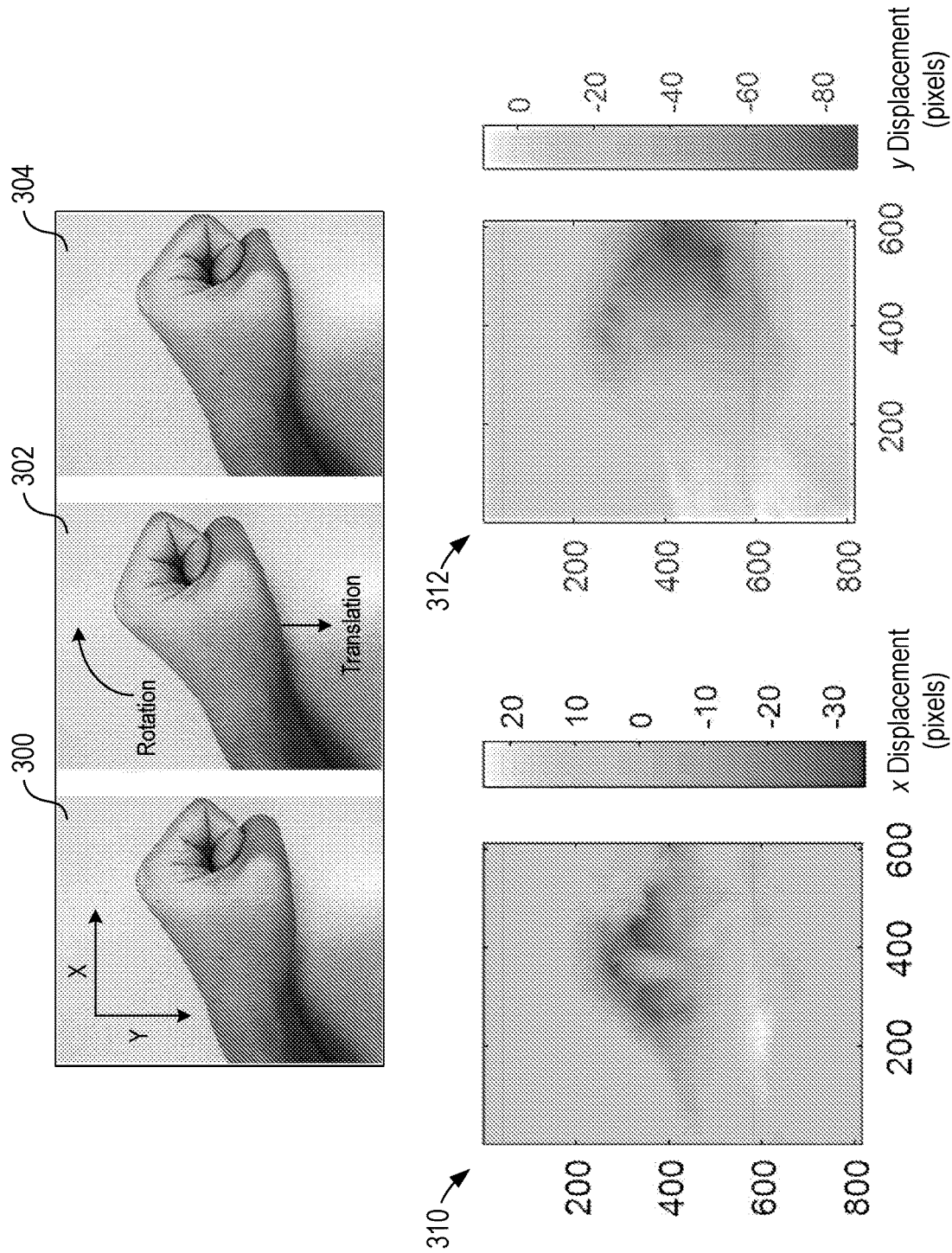
FIG. 3 illustrates an example of intensity-based image registration according to various embodiments of the present disclosure.

To further align features among images, the image registration engine 132 is also configured to perform an intensity-based image registration through a non-rigid transformation. Unlike rigid-body transformation through feature-based image registration, intensity-based image registration is a non-rigid image transformation procedure. As an example, FIG. 3 illustrates an intensity-based image registration between the images 300 and 302 of a human hand, captured at different wrist rotations.

The image registration engine 132 is configured to register the image 302 to a new coordinate system or orientation that matches the intensity distribution of the image 300. As shown in FIG. 3, to complete the registration process, the hand in image 302 should be subject to a combined movement of rotation and translation. Feature-based image registration is unable to solve this problem as the hand has a non-rigid geometric distortion between the images 300 and 302. Instead, image registration engine 132 performs an intensity-based image registration to register the image 302 to match the hand posture of the image 300.

In the registration procedure, image registration engine 132 generates the displacement fields 310 and 312. The displacement field 310 shows the displacement necessary to align the image 302 with the image 300 in the x direction, and the displacement field 312 shows the displacement necessary to align the image 302 with the image 300 in the y direction. As one example, the demon-based image registration algorithm can be adopted, while other image registration algorithms could also be applicable. The intensity-based registration of the image 302 to the image 300 is shown in image 304.

It is noted that the feature-based image registration shown in FIG. 2 can effectively align two input images into the same coordinate system based on correspondences. However, small misalignments are commonly associated with feature-based image registration. The intensity-based image registration shown in FIG. 3, on the other hand, is able to adjust small misalignments but may have difficulties handling significant misalignments. By adopting these two image registration processes in a successive manner, the misalignments between two input images can be effectively reduced in two steps.

After the image registration engine 132 registers two images to the same coordinate system (i.e., aligns a second image to the coordinate system of a first image as described above), the registration map generator 134 (FIG. 1) is configured to determine a registration error map based on a pixel-by-pixel comparison of the first image and the second image. Particularly, to generate the registration error map, the image registration engine 132 can be configured to calculate a pixel intensity difference between each pixel in the first image and a corresponding pixel in the second image. Thus, assuming the first and second images are of the same pixel dimensions, the registration error map can be the same pixel dimensions as the first and second images.

Registration errors in the registration error map can be defined as the absolute intensity difference between corresponding pixels among the two images. As one example, pixels with exactly matched intensities can be registered as 0 (e.g., black) in the registration error map, while intensities of unmatched pixels can be registered in the range of 1 to 255 (e.g., from grey to white) in the registration error map, depending on the level of discrepancy. However, other encoding schemes can be used to reflect differences in pixel intensities in the registration error map. In the example registration error maps shown in the drawings, however, pixels with exactly matched intensities are shown as either white or light grey, to avoid large black areas in the drawings, and pixels with mismatched intensities are shown as black or dark grey.

Since processing errors and noise are inevitable in the image registration and error map generation procedures, the registration map generator 134 is also configured to perform an edge-aware noise reduction algorithm on registration error maps, as described in further detail below with reference to FIG. 8. The algorithm can effectively eliminate background noise in registration error maps while still preserving edge features in registration error maps. After noise reduction, the registration map generator 134 can also conduct a feature enhancement process on registration error maps, to further highlight cracks for detection. As one example, the registration map generator 134 can convert the registration error map from a black-white color spectrum to a white-red color spectrum as the feature enhancement process, so that cracks can be more easily visualized on a display device and identified by individuals.

In some cases, the fatigue crack detector 136 (FIG. 1) is configured to identify, quantify, and qualify fatigue cracks based on the results provided by the registration map generator 134. The fatigue crack detector 136 can analyze the registration maps to determine the size, shape, length and other characteristics of fatigue cracks using image processing techniques in an automated fashion.

Figure 4:
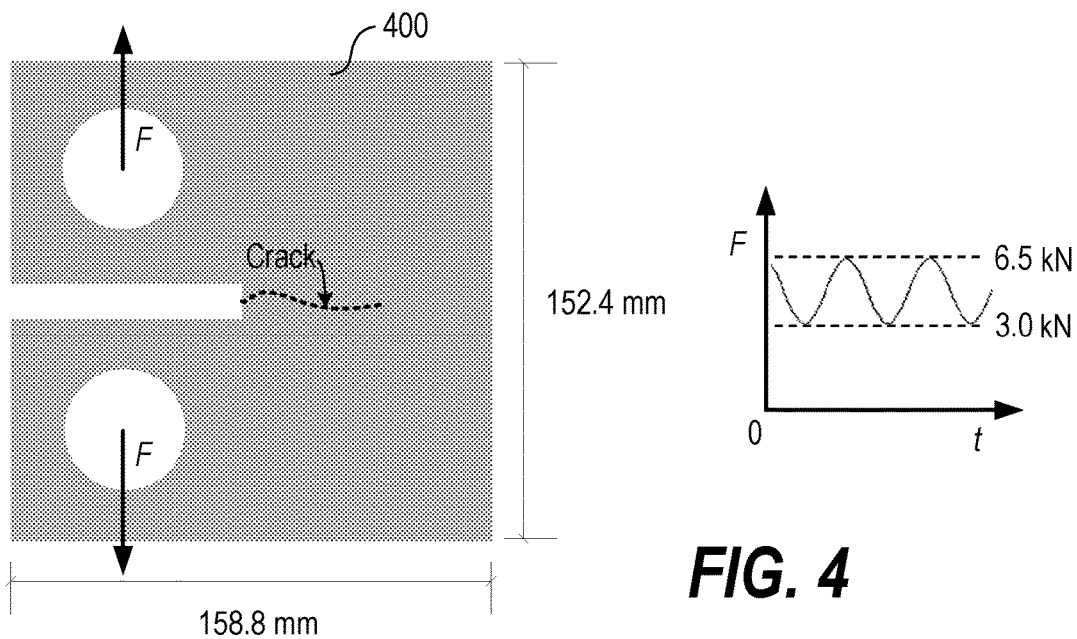
FIG. 4 illustrates an example compact tension test setup for fatigue crack detection according to various embodiments of the present disclosure.
Figure 5:
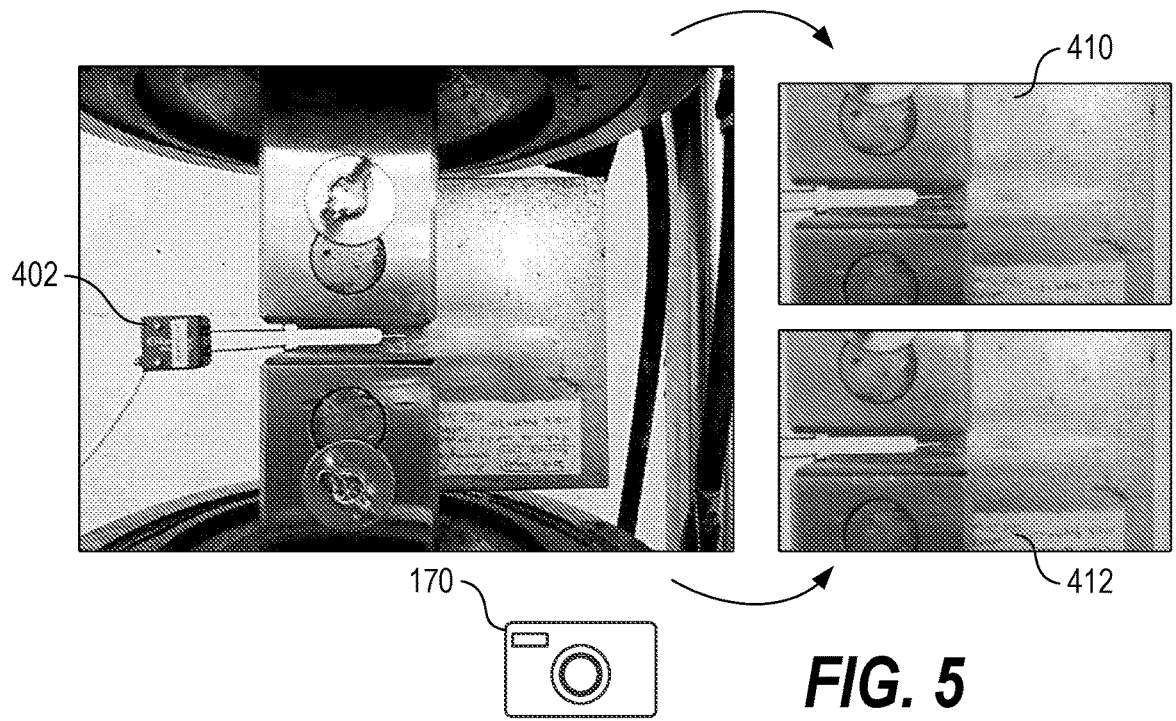
FIG. 5 illustrates representative images of a compact tension test setup taken at different times according to various embodiments of the present disclosure.

Turning to experimental results of the processes described herein, FIG. 4 illustrates an example compact tension (C(T)) test setup for fatigue crack detection, and FIG. 5 illustrates representative images of the test setup. A C(T) specimen 400 fabricated by A36 steel was used for experimental investigation. The specimen 400 is a single edge-notched steel plate loaded in tension force through two devises, as shown in FIG. 5. The specimen 400 was 6.4 mm in thickness. Prior to the experiment, the specimen 400 had been fatigue loaded and an existing fatigue crack was found on the surface of the specimen with a length of 53.3 mm. A closed-loop servo-hydraulic uniaxial load frame was adopted for applying the fatigue load to the specimen 400. The fatigue load cycles were a 0.5 Hz harmonic signal with a range of 3.0 kN to 6.5 kN as shown in FIG. 4. To physically measure the opening of the crack in the specimen 400 over time, a clip-on displacement gauge 402 (Epsilon 3541-0030-150T-ST) was installed at the front face the specimen 400, as shown in FIG. 5. Two images 410 and 412 captured by the image capture device 170 are also shown in FIG. 5, and form the basis for results shown in FIGS. 6 and 7. Regular indoor lighting conditions were relied upon during the capture of the images 410 and 412.

Figure 6:
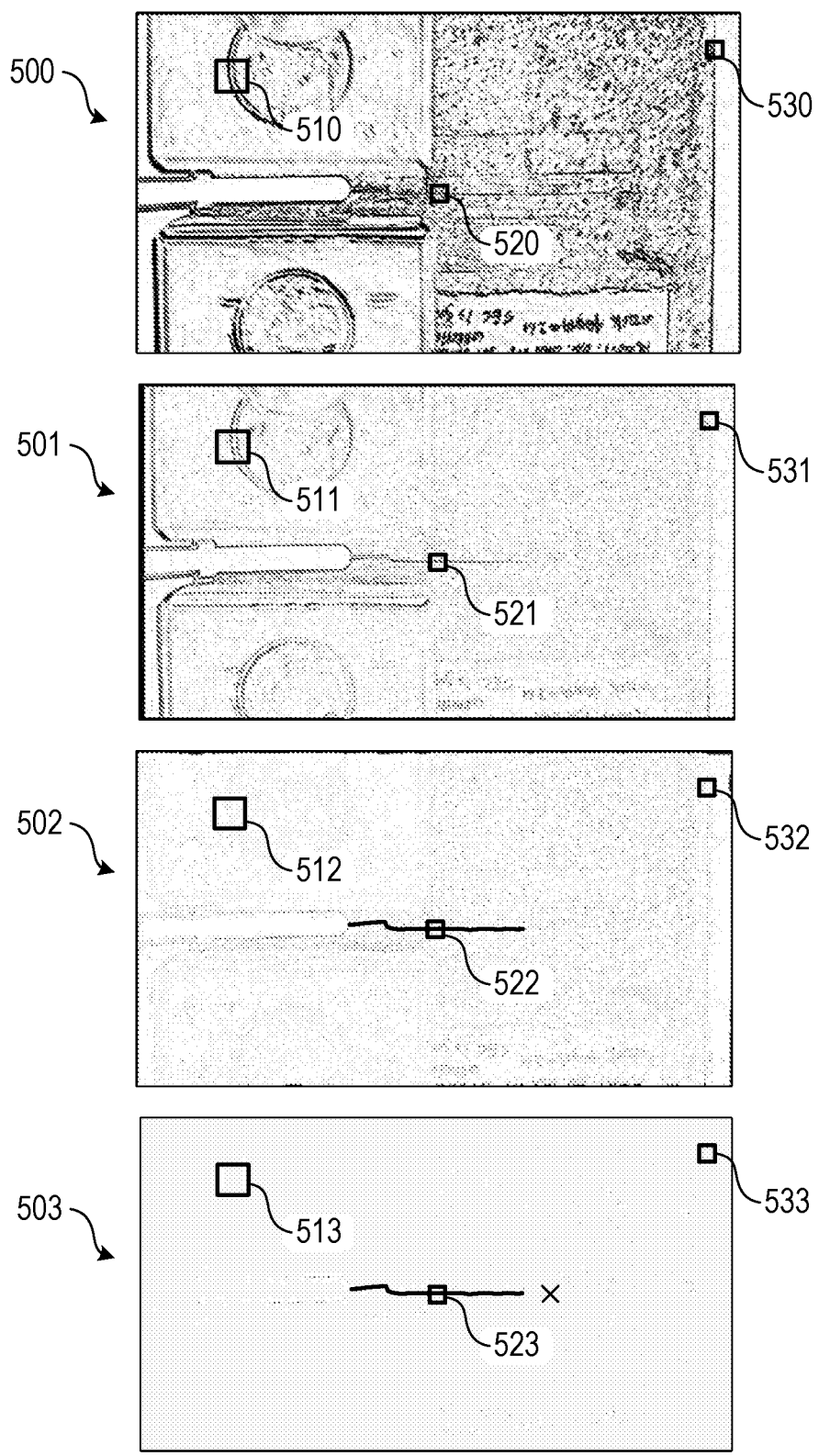
FIG. 6 illustrates a number of representative registration error maps for the compact tension test setup shown in FIG. 5 at various stages of a process for fatigue crack detection according to various embodiments of the present disclosure.
Figure 7:
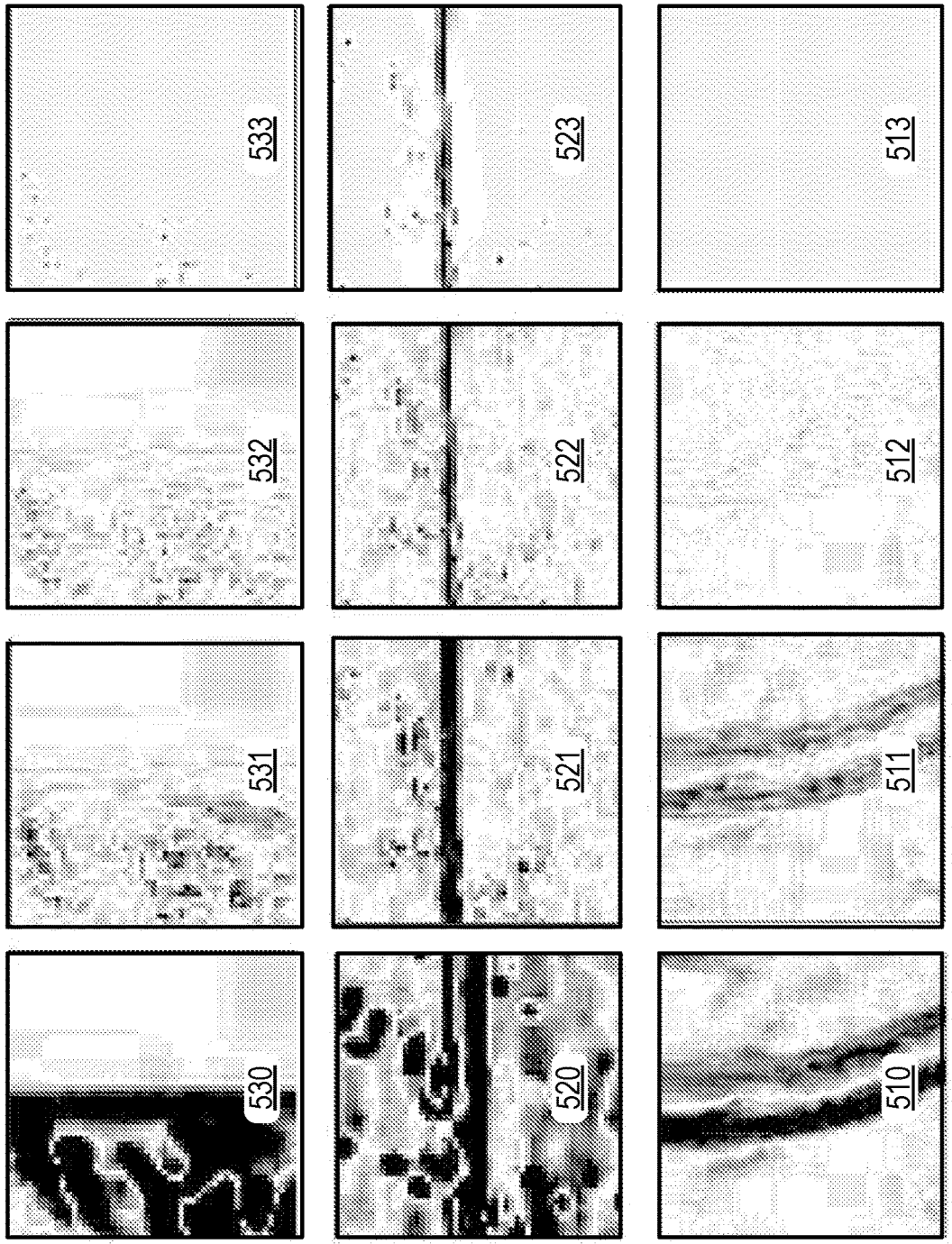
FIG. 7 illustrates certain regions of interest in the registration error maps shown in FIG. 6 according to various embodiments of the present disclosure.

FIG. 6 illustrates a number of representative registration error maps 500-503 generated from the images 410 and 412 in FIG. 5, and FIG. 7 illustrates certain regions of interest 510-513, 520-523, and 530-533 in the registration error maps 500-503 shown in FIG. 6. As shown in FIG. 6, regions 530-533 overlap with the boundary of the C(T) specimen 400 with a region of 50 pixels by 50 pixels. Regions 520-523 overlap with the fatigue crack of the C(T) specimen 400 with a region of 50 pixels by 50 pixels. Regions 510-513 overlap with a gap between the clevis and the rod that apply the load to the C(T) specimen 400 with a region of 100 pixels by 100 pixels. All the regions 510-513, 520-523, and 530-533 contain edge-like features, but only regions 520-523 overlap with the fatigue crack of the C(T) specimen 400.

The process begins with image acquisition. As shown in FIG. 5, the image capture device 170 is used to capture the images 410 and 412 at different times under fatigue load cycles with regular indoor lighting conditions. The registration error map 500 in FIG. 6 shows an initial intensity comparison of the two images 410 and 412, as initially generated by the registration map generator 134 without any feature-based or intensity-based image alignment processes being performed. Typically, black (i.e., 0 intensity) represents exactly matched pixels, and grey (i.e., intensity from 1 to 255) represents unmatched pixels. However, in FIG. 6, white or light grey represents matched pixels, and dark grey or black represents unmatched pixels.

As shown in the registration error map 500, because the two images 410 and 412 were taken while the image capture device 170 was hand-held, the camera poses of the two images 410 and 412 are not the same. Thus, a geometric distortion exists between the images 410 and 412. Since the surface textures of the C(T) specimen 400 are subjected to rigid-body movement, directly overlapping the two images 410 and 412 to uncover the fatigue crack would be challenging, as evident based on a review of the registration error map 500.

Next, the image registration engine 132 was used to perform a feature-based image registration to align features of the second image 412 with the first image 410, and the registration map generator 134 was used to determine the registration error map 501. As seen in the registration error map 501, misalignments between the first image 410 and the second image 412 are significantly reduced. However, some misalignments still exist, especially around the boundary of the clevis pins, as best shown in the region 511 in FIG. 7.

To further reduce registration errors, the image registration engine 132 was used to perform an intensity-based image registration to further align features of the second image 412 with the first image 410, and the registration map generator 134 was used to determine the registration error map 502 shown in FIG. 6. As seen in the registration error map 502, misalignments between the first image 410 and the second image 412 are further reduced. As can be seen in the registration error map 502, the fatigue crack still provokes significant registration errors due to the differential crack opening between the two images 410 and 412. On the other hand, other surface textures of the C(T) specimen 400 do not induce such significant errors.

Finally, the image registration engine 132 was used to perform edge-aware noise reduction on the registration error map 502, in order to remove the background noise while still preserving edge features in the registration error map 502. Results of the enhanced registration errors are shown the registration error map 503 in FIG. 6. The purpose of the edge-aware noise reduction is to reduce the noise content the registration error map 503 while preserving the edge features in it.

Figure 8:
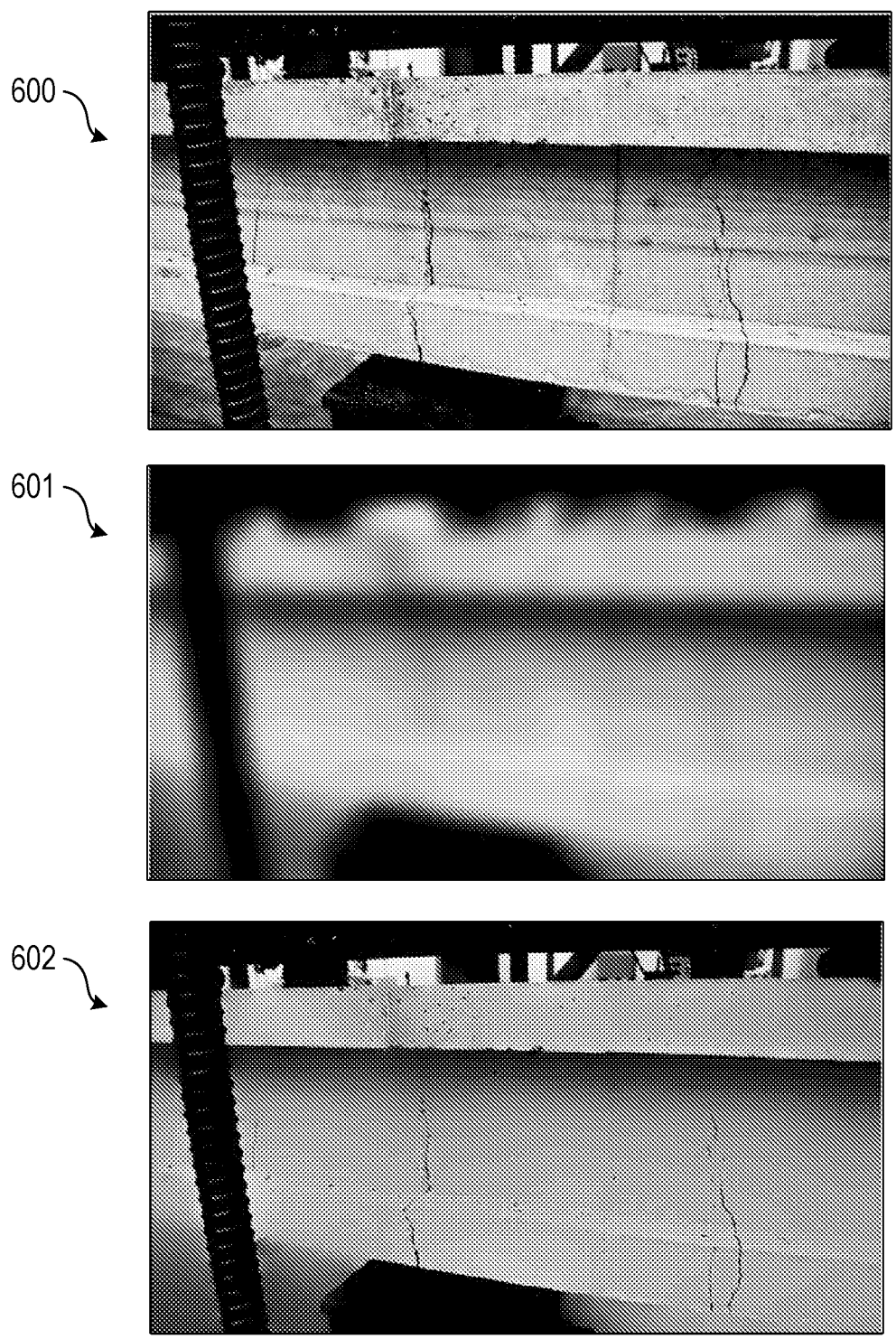
FIG. 8 illustrates examples of noise reduction techniques according to various embodiments of the present disclosure.

FIG. 8 shows a comparison between the edge-aware noise reduction techniques used by the image registration engine 132 and traditional filtering methods. As an example, the image 600 shows a concrete girder with complex textures. These textures can be categorized as edge features (e.g., concrete surface cracks and boundaries of the reinforced bar) and background noise (e.g., surface marks on the concrete surface). To remove the background noise, the results of two approaches are shown, including the use of a 2D Gaussian filter, as shown in the image 601 in FIG. 8, and the edge-aware noise reduction method, as shown in the image 602 in FIG. 8. In general, the 2D Gaussian filter can be applied with a standard deviation $\sigma$ of 1, 5, and 10, for example, and the edge-aware noise reduction method can be applied with a detail smoothing factor $\alpha$ of 1.5, 3, and 5, for example. A higher factor $\alpha$ leads to more severe smoothing effect in the background noise, and a suitable factor $\alpha$ can be selected to preserve edge features.

As demonstrated in the comparison shown in FIG. 8, the traditional 2D Gaussian filter effectively reduced the noise level of the input image by blurring the textures. As a tradeoff, the edge features (e.g., the surface cracks and reinforced bar) would be contaminated as well. On the other hand, the edge-aware noise reduction method can remove the noise content without eroding the edge features, and is selected as the method for removing the noise content of registration errors in the image overlapping process.

Referring again to FIG. 6, the registration map generator 134 can also convert the registration error map 503 from a black-white color spectrum to a white-red color spectrum, so that cracks can be more easily visualized on a display device of the client device 160 (FIG. 1), for example, and identified by individuals. In FIG. 6, the tip of the fatigue crack is marked using a black cross in the registration error map 503, as identified by human eye.

An important observation from the results shown in FIGS. 6 and 7 is that the image overlapping processes described herein can produce reliable crack detection results even when a fatigue crack is surrounded by other non-crack edges. For instance, the non-crack edges in the regions 510-513, which are at the boundary of the C(T) specimen 400 and gap between the clevis and pin, can be recognized by the image overlapping process as non-crack features and are eliminated in the crack detection results. Distinguishing these non-crack edges from the true fatigue crack could be challenging for traditional edge detection-based crack detection methods.

Figure 9:
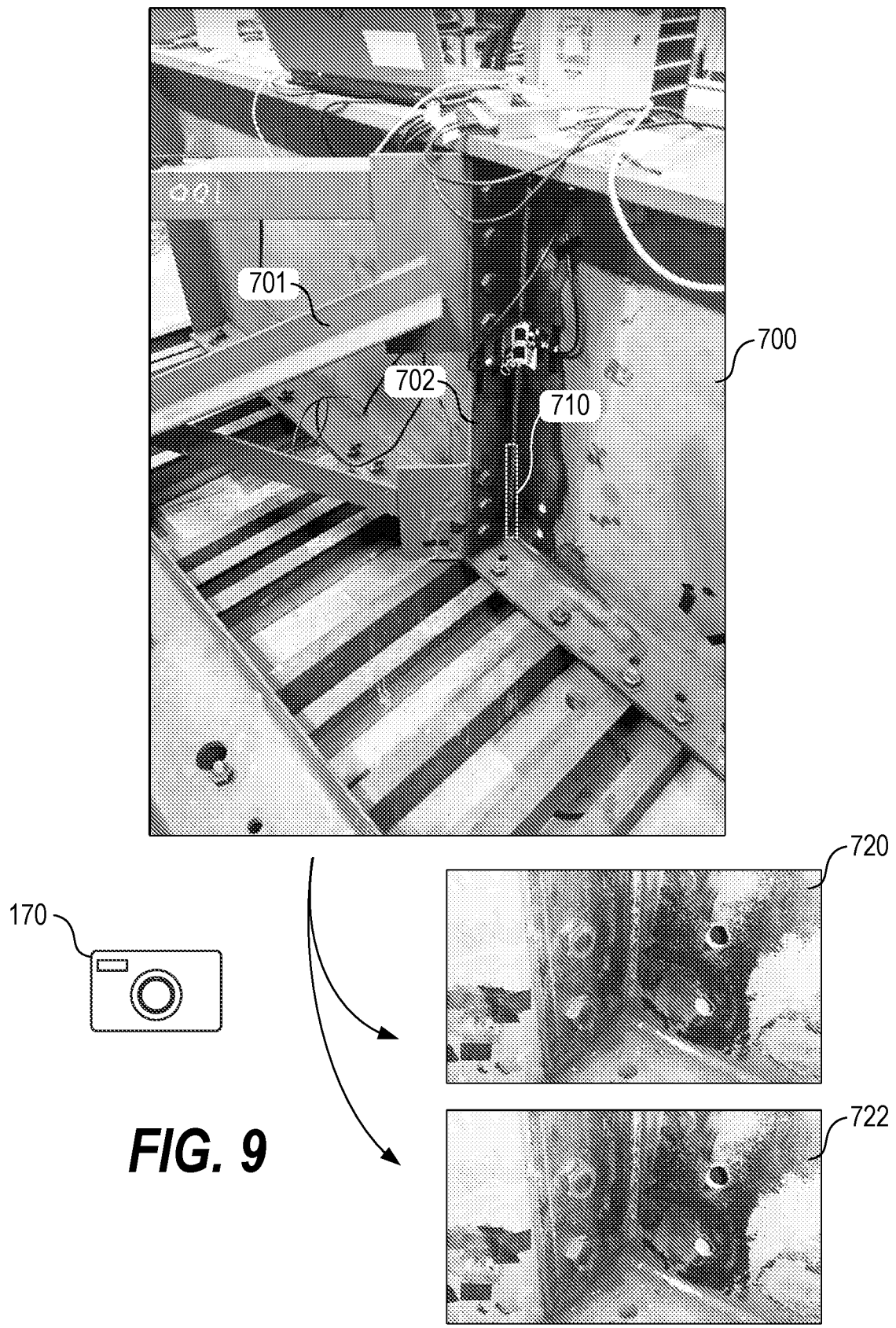
FIG. 9 illustrates a representative image of a beam test setup according to various embodiments of the present disclosure.

In a second test setup, a bridge girder to cross-frame connection specimen was used. The design of the test specimen was to simulate the typical structural layout of fatigue susceptible regions of steel girder bridges built prior to the mid-1980s in the United States. A portion of the test setup is shown in FIG. 9. To setup the test specimen, a bridge girder 700 was mounted upside-down to the lab floor in order to simulate the constraint of the bridge deck. A cross frame 701 was installed to the girder 700 through a connection plate 702. The connection plate 702 was fillet welded to the web of the girder 700 with a gap between the bottom of the connection plate 702 and the bottom flange of the girder 700. On the far end of the cross frame, an actuator was attached to apply vertical fatigue load. Prior to the experimental test, the specimen had been fatigue loaded with 2.7 million cycles, leading to an existing vertical fatigue crack in the area 710 between the web of the girder 700 and the connection plate 702. During the test, the fatigue load cycles were a 0.5 Hz harmonic signal with a range of 0 kN to 11.1 kN.

Figure 10:
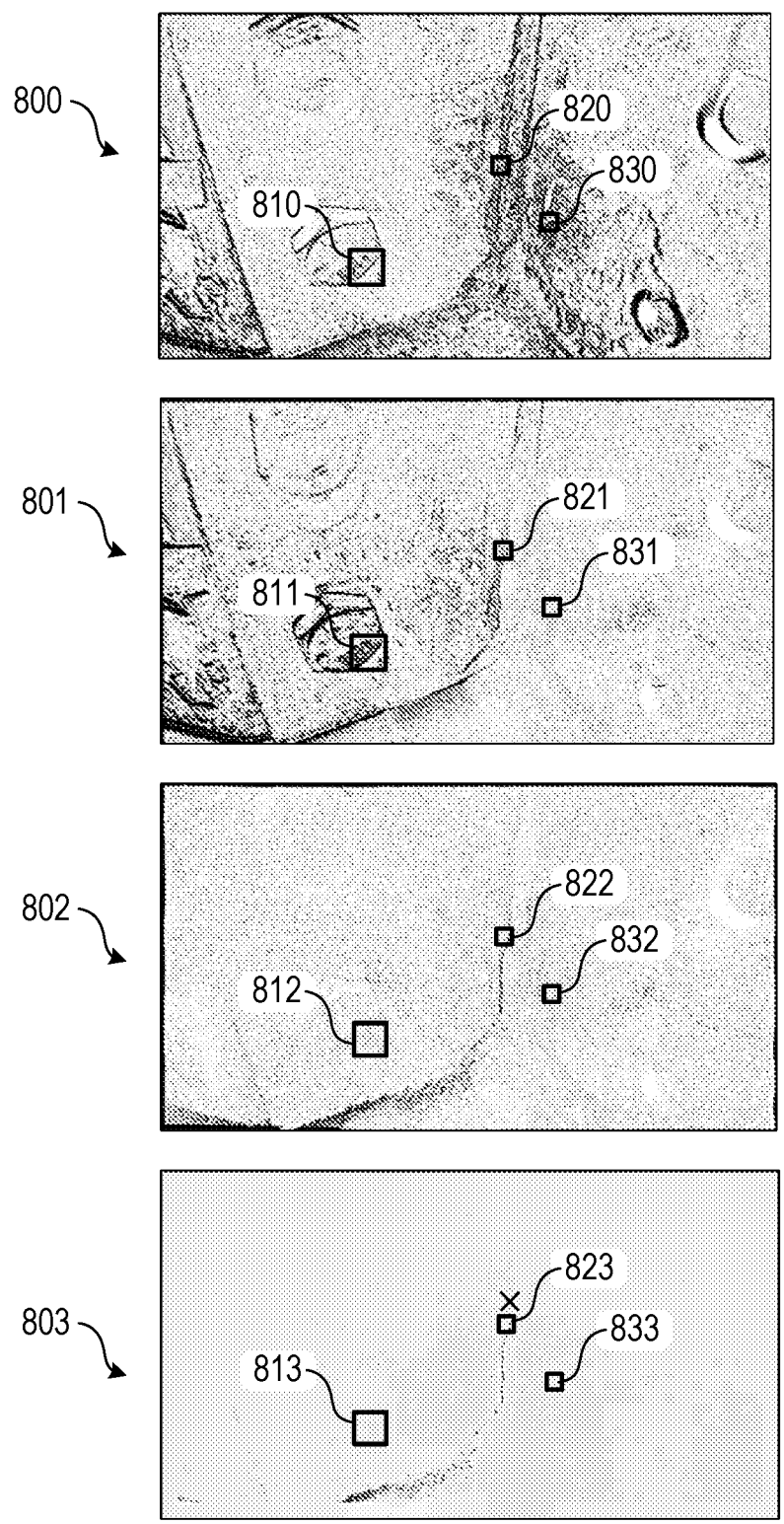
FIG. 10 illustrates a number of representative registration error maps for the beam test setup shown in FIG. 9 at various stages of a process for fatigue crack detection according to various embodiments of the present disclosure.
Figure 11:
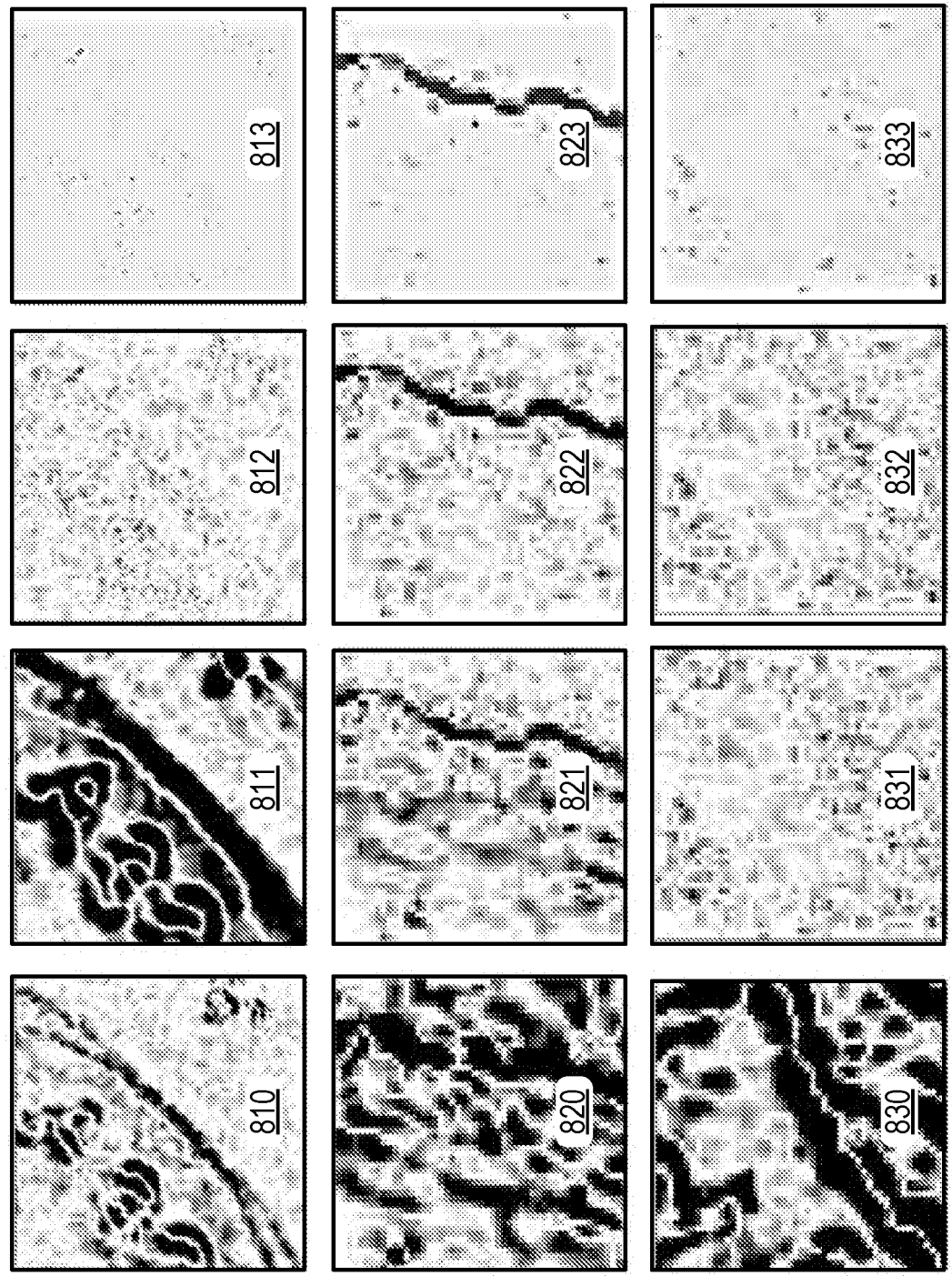
FIG. 11 illustrates certain regions of interest in the registration error maps shown in FIG. 10 according to various embodiments of the present disclosure.

Two images 720 and 722 of the test setup shown in FIG. 9 were captured at different times using the image capture device 170 the setup was under fatigue load. FIGS. 10 and 11 illustrate the experimental results according to various embodiments of the present disclosure. FIG. 10 illustrates a number of representative registration error maps 800-803 generated from the images 720 and 722 of the test setup shown in FIG. 9, and FIG. 10 illustrates certain regions of interest 810-813, 820-823, and 830-833 in the registration error maps 800-803 shown in FIG. 9. As shown in FIG. 9, regions 810-813 overlap with a steel bolt on the connection plate a region of 100 pixels by 100 pixels. Regions 820-823 overlap with the fatigue crack in the area 710 between the web of the girder 700 and the connection plate 702 with a region of 50 pixels by 50 pixels. Regions 830-833 overlap with a region on the web of the steel girder 700 with a region of 50 pixels by 50 pixels. All the regions 810-813, 820-823, and 830-833 contain edge-like features, but only regions 820-823 overlap with the fatigue crack.

The image capture device 170 was used to capture the two images 720 and 722 of the test setup shown in FIG. 9 at different times under fatigue load cycles with regular indoor lighting conditions. The registration error map 800 in FIG. 10 shows an initial intensity comparison of the two images 720 and 722, as initially generated by the registration map generator 134 without any feature-based or intensity-based image alignment processes being performed. Typically, black (i.e., 0 intensity) represents exactly matched pixels, and grey (i.e., intensity from 1 to 255) represents unmatched pixels. However, in FIG. 10, white or light grey represents matched pixels, and dark grey or black represents unmatched pixels.

As shown in the registration error map 800, because the two images 720 and 722 were taken while the image capture device 170 was hand-held, the camera poses of the two images 720 and 722 are not the same. Thus, a geometric distortion exists between the images 720 and 722. Since the surface textures of the girder 700 and the connection plate 702, for example, are subjected to rigid-body movement, directly overlapping the two images 720 and 722 to uncover the fatigue crack would be challenging, as evident based on a review of the registration error map 800.

Next, the image registration engine 132 was used to perform a feature-based image registration to align features of the second image 722 with the first image 720, and the registration map generator 134 was used to determine the registration error map 801 shown in FIG. 10. As seen in the registration error map 801, misalignments between the first image 720 and the second image 722 are significantly reduced. However, some misalignments still exist.

To further reduce registration errors, the image registration engine 132 was used to perform an intensity-based image registration to further align features of the second image 722 with the first image 720, and the registration map generator 134 was used to determine the registration error map 802. As seen in the registration error map 802, misalignments between the first image 720 and the second image 722 are further reduced. As can be seen in the registration error map 802, the fatigue crack still provokes significant registration errors due to the differential crack opening between the two images 720 and 722. On the other hand, other surface textures of the girder 700 and the connection plate 702 do not induce such significant errors.

Finally, the image registration engine 132 was used to perform edge-aware noise reduction on the registration error map 802, in order to remove the background noise while still preserving edge features in the registration error map 802. Results of the enhanced registration errors are shown the registration error map 803 in FIG. 10. As described above, the purpose of the edge-aware noise reduction is to reduce the noise content the registration error map 503 while preserving the edge features in it.

The registration map generator 134 can also convert the registration error map 803 from a black-white color spectrum to a white-red color spectrum, so that cracks can be more easily visualized on a display device of the client device 160 (FIG. 1), for example, and identified by individuals. In FIG. 10, the tip of the fatigue crack is marked using a black cross in the registration error map 803, as identified by human eye. An important observation from the results shown in FIGS. 10 and 11 is that the image overlapping processes described herein can produce reliable crack detection results even when a fatigue crack is surrounded by other non-crack edges.

One question is the performance of the image overlapping processes described herein when the input images capture only partial opening of a breathing fatigue crack. An investigation was performed based on controlled laboratory settings. In one case, since the fatigue load was known as being applied at a 0.5 Hz harmonic cycle, two input images were collected at the approximate moments when the crack reached its identifiable maximum and minimum openings, meaning the full opening of the crack was utilized in the algorithm. For detecting fatigue cracks in steel bridges in the field, the fatigue load may not be known a priori, and the two input images cannot be guaranteed to capture the minimum and maximum crack openings, respectively. The performance of the image overlapping processes when only a partial opening of a breathing fatigue crack is captured is evaluated below.

Figure 12:
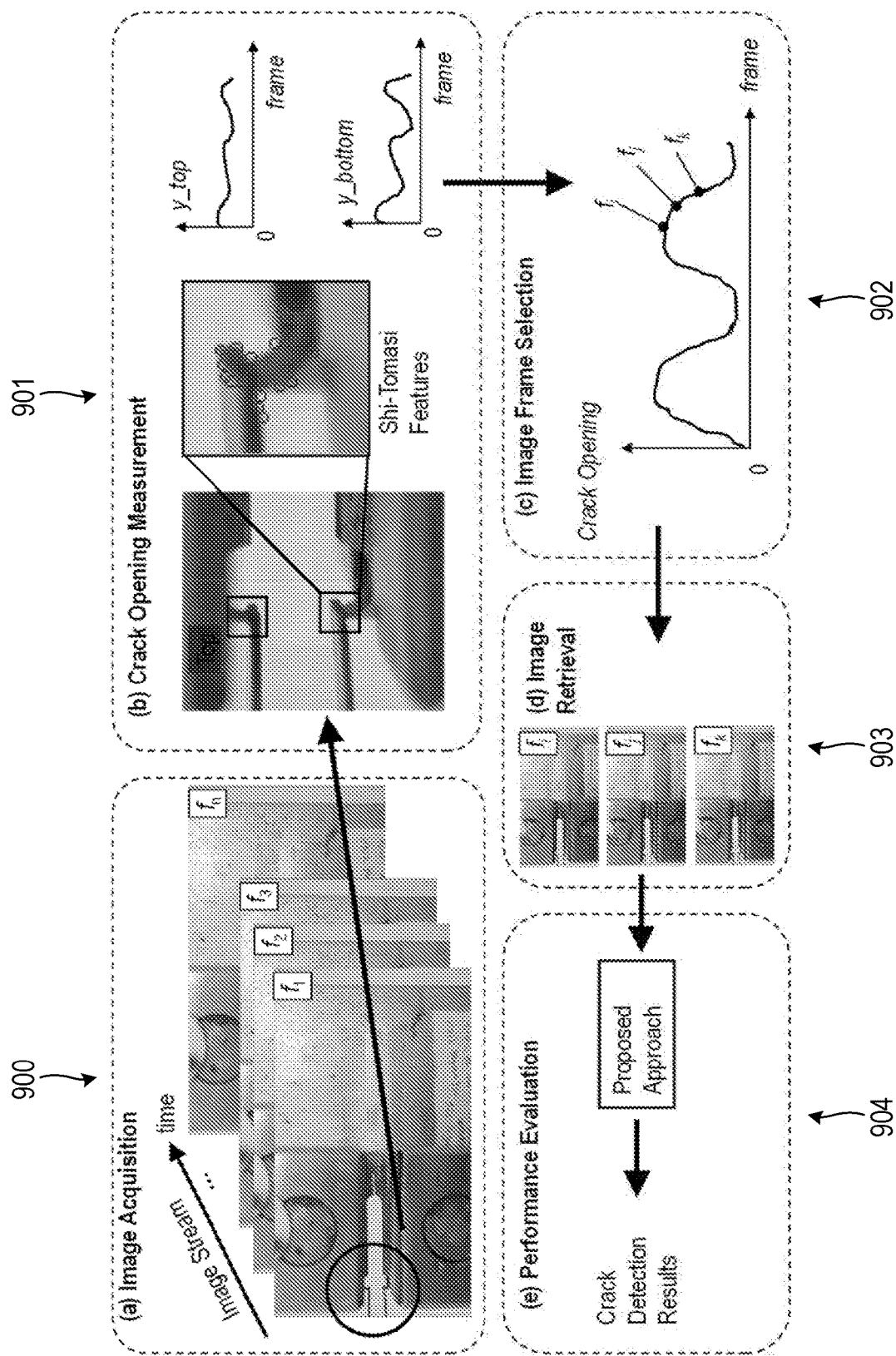
FIG. 12 illustrates an image overlapping process used for robustness evaluation according to various embodiments of the present disclosure.

FIG. 12 illustrates the image overlapping process used for the robustness evaluation according to various embodiments of the present disclosure. The C(T) specimen was adopted for this investigation. A 2-sec video stream of the C(T) specimen was collected by the image capture device 170 at step 900 using hand-held mode at a rate of 30 frames per second. Subsequently, the opening of the crack at the left edge of the specimen was tracked using the clip-on displacement gauge 402 at step 901.

Two small image windows with 50 pixels by 50 pixels were deployed at each side of the notch, denoted top and bottom windows, respectively. Shi-Tomasi features were then extracted within each window throughout the 2-sec video. The vertical movements of these feature points can be tracked through the KLT tracker in terms of pixels at step 902. The average vertical movement among all feature points within each window was computed, denoted with y top and y bottom, to represent the movement of top and bottom windows, respectively. Finally, by subtracting y top and y bottom, the crack opening at the front face of the specimen can be obtained. Based on the tracked crack opening response, a series of frames were selected within one full crack breathing cycle at step 902, denoted as $f_i$, $f_j$, and $f_k$, in FIG. 12.

The corresponding video frames at $f_i$, $f_j$, and $f_k$ were then retrieved from the collected video stream at step 903. The combinations of each two video frames in all selected frames (e.g., $f_i$ and $f_j$, or $f_i$ and $f_k$) would form pairs of two input images that only partially captured the opening of the breathing crack. Utilizing the image overlapping process, the performances of these selected cases was evaluated at step 904.

Figure 13:
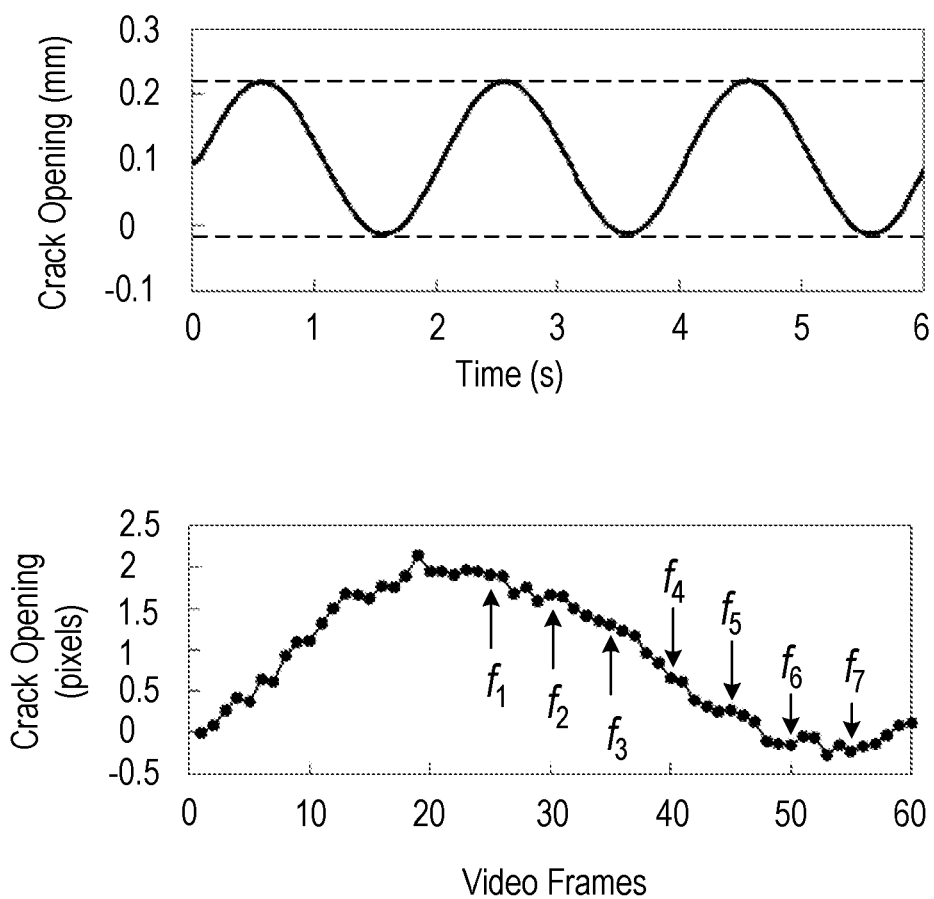
FIG. 13 illustrates measurements taken in the image overlapping process used for robustness evaluation in FIG. 12 according to various embodiments of the present disclosure.

FIG. 13 illustrates measurements taken in the image overlapping process used for robustness evaluation in FIG. 12. The top plot in FIG. 13 shows the ground truth measurements of the crack opening at the left edge of the C(T) specimen obtained by the clip-on displacement gauge 402. The crack opening includes 0.5 Hz harmonic cycles with a peak-to-peak amplitude of 0.233 mm. Utilizing the crack opening tracking methodology described herein, the camera-based crack opening measurement at the same location of the specimen is at the bottom of FIG. 13 in terms of pixels. Despite slight noise content, a harmonic signal is also obtained. The crack opening reaches its maximum at around the $25^{th}$ frame, while reaching its minimum at around the $55^{th}$ frame. Hence, the duration of a half cycle is about 30 frames (1 sec), which agrees well with the clip-on gauge measurement shown in the top plot in FIG. 13.

Figure 14:
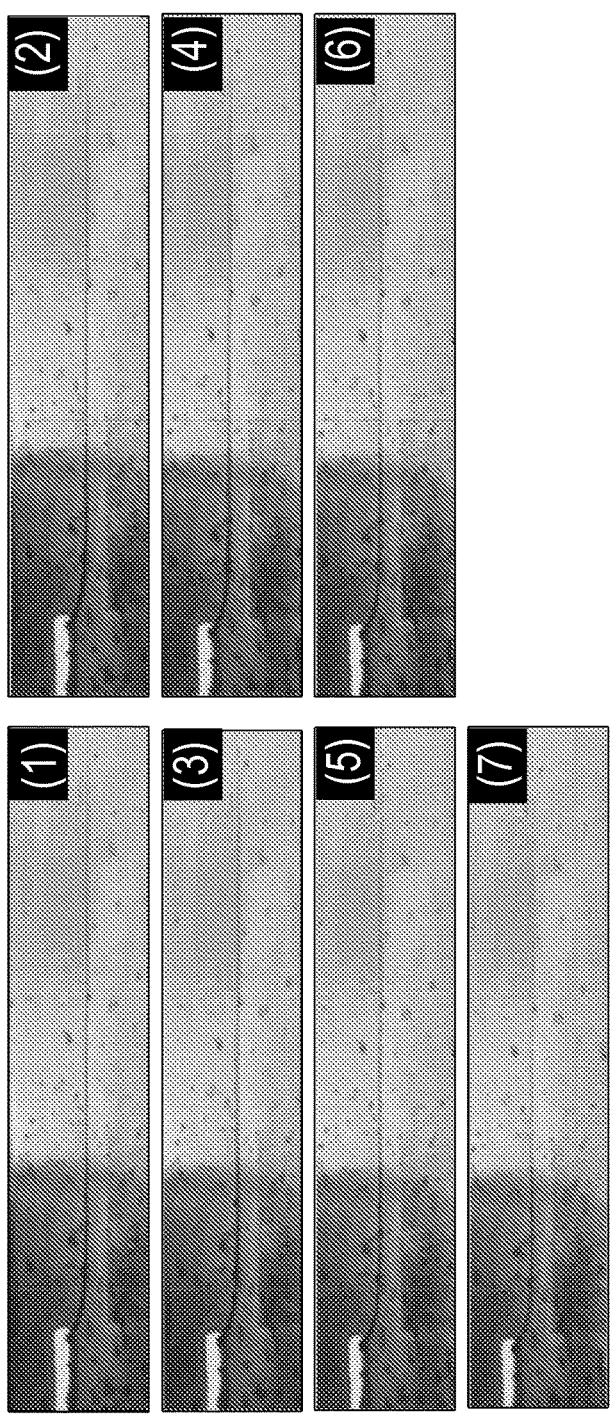
FIG. 14 illustrates close-up images of video frames taken in the image overlapping process used for robustness evaluation in FIG. 12 according to various embodiments of the present disclosure.
Figure 15:
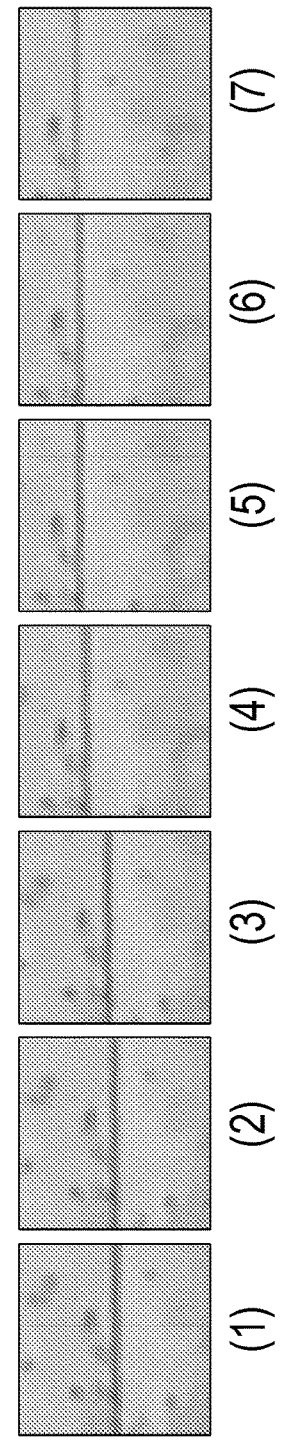
FIG. 15 illustrates close-up images of video frames taken in the image overlapping process used for robustness evaluation in FIG. 12 according to various embodiments of the present disclosure.

Using the results from the bottom plot in FIG. 13, 7 video frames are selected at the $25^{th}$, $30^{th}$, $35^{th}$, $40^{th}$, $45^{th}$, $50^{th}$, and $55^{th}$ frames, denoted as frame $f_1$ to $f_7$ in FIG. 13. Close-up images of the corresponding video frames are shown in FIGS. 14 and 15. Particularly, FIG. 14 includes 500 pixel by 100 pixel regions from the frames, covering a majority of the fatigue crack, and FIG. 15 includes 50 pixel by 50 pixel localized areas within the regions shown in FIG. 14. As can be found in FIGS. 14 and 15, the thickness of the crack gradually decreases from frame $f_1$ to $f_7$ (i.e., from images (1) to (7)). In addition, due to the hand-held mode of the camera, video frames are affected by rigid-body movements as shown in FIG. 15.

Figure 16:
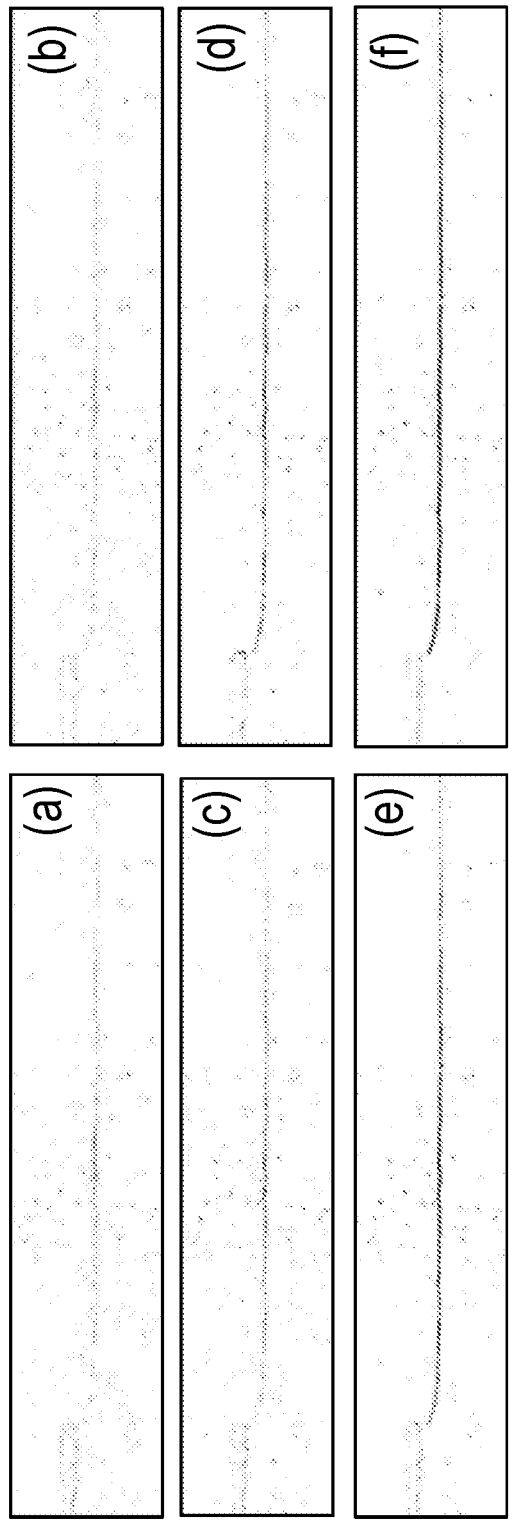
FIG. 16 illustrates results of the image overlapping process used for robustness evaluation according to various embodiments of the present disclosure.
Figure 17:
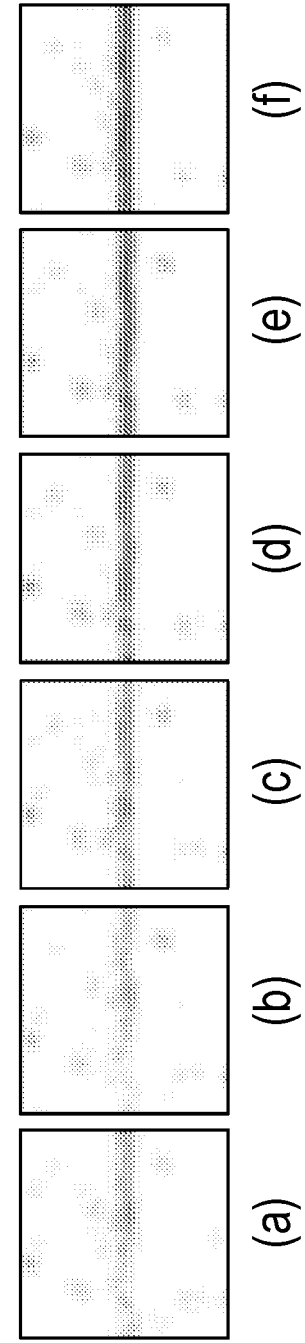
FIG. 17 illustrates results of the image overlapping process used for robustness evaluation according to various embodiments of the present disclosure.

FIGS. 16 and 17 shown the results of the image overlapping processes described herein, used on the images shown in FIGS. 14 and 15. Table 1 summaries the test matrix in this investigation, where frame $f_1$ is treated as the reference frame and paired with each of frames $f_2$ to $f_7$ to form six pairs of input images for analysis. As a result, six test cases are established, denoted Test 1 to Test 6 in the table. Test 1 ($f_1$ and $f_2$) only captures a very limited cracking opening, while Test 6 ($f_1$ and $f_7$) captures the full response of the breathing crack, a peak-to-peak amplitude of 0.233 mm at the left edge of the specimen.

TABLE 1

Test matrix for robustness evaluation

| Test case | Selected input video frames | Results |
| --- | --- | --- |
| Test 1 | $f_1$ and $f_2$ | (a) in FIG. 16 and FIG. 17 |
| Test 2 | $f_1$ and $f_3$ | (b) in FIG. 16 and FIG. 17 |
| Test 3 | $f_1$ and $f_4$ | (c) in FIG. 16 and FIG. 17 |
| Test 4 | $f_1$ and $f_5$ | (d) in FIG. 16 and FIG. 17 |
| Test 5 | $f_1$ and $f_6$ | (e) in FIG. 16 and FIG. 17 |
| Test 6 | $f_1$ and $f_7$ | (f) in FIG. 16 and FIG. 17 |

As shown in FIGS. 16 and 17, the intensities of the crack features become higher from Test 1 to Test 6. The result indicates capturing a larger crack opening in the two input images yields better crack detection quality. Nevertheless, despite larger noise content, the image overlapping process still identified the fatigue crack even though the two input images capture only a very limited opening of the breathing crack such as in Test 1.

Figure 18:
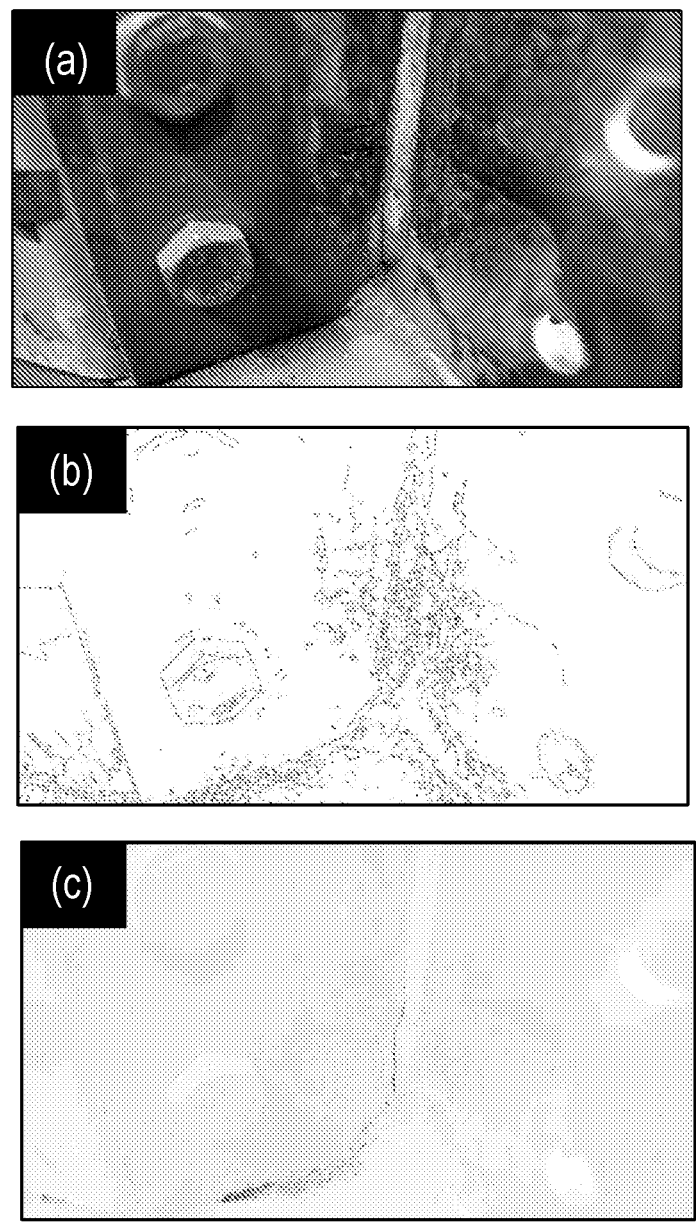
FIG. 18 illustrates results of a comparative evaluation according to various embodiments of the present disclosure.

A comparative evaluation was also performed to demonstrate the fundamental difference of the image overlapping process with traditional edge detection-based crack detection methods, and FIG. 18 illustrates results of the comparative evaluation. A Canny edge detector was adopted using the bridge test setup as part of the evaluation. FIG. 18, frame (a) shows the input image for edge detection, and frame (b) in FIG. 18 shows the detection results using the Canny edge detector. As can be seen, many edge features are identified by the Canny edge detector, while the true fatigue is submerged in these edge features in this case. Distinguishing the true fatigue crack from many non-crack edges could be challenging and may require further processing. On the other hand, the image overlapping process can robustly identify the fatigue crack as shown in frame (c) in FIG. 18.

It should be noticed that the nature of the image overlapping processes described herein is based on sensing breathing cracks. To ensure the success of the proposed approach, the monitored structure should be under a repetitive fatigue load during image collection. However, this requirement could be easily fulfilled in field applications, as most civil structures which suffer from fatigue cracks are likely continuing to carry the fatigue loading under their operational life.

Figure 19:
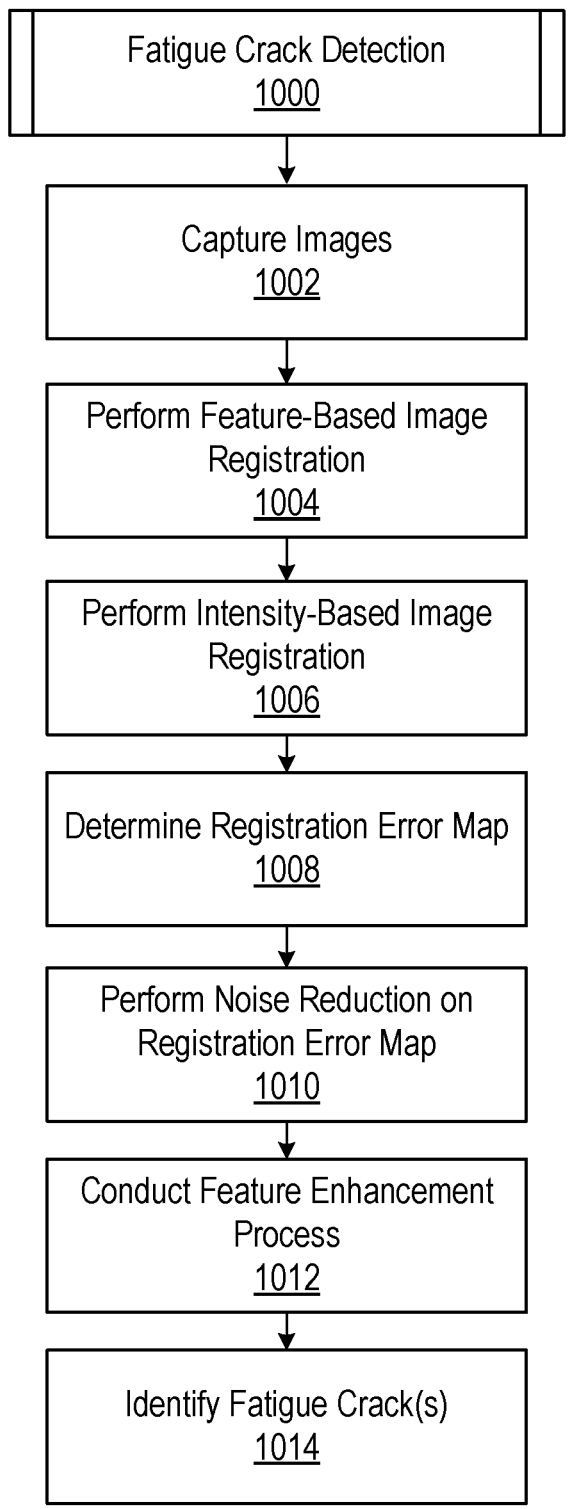
FIG. 19 illustrates an example process for fatigue crack detection according to various embodiments of the present disclosure.

FIG. 19 illustrates an example process 1000 for fatigue crack detection according to various embodiments of the present disclosure. The process 1000 is described in connection with computing device 100 shown in FIG. 1, although other computing devices can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

At step 1002, the process 1000 includes the image capture device 170 capturing a number of images, including first and second images, respectively, at first and second times. As noted above, the image capture device 170 can be embodied as one or more image or video cameras capable of capturing a sequence of images or videos at any suitable frame rate and resolution. The image capture device 170 can be professional- or commercial-grade device including one or more image sensors, lenses, image processors, memory devices, illumination sources, and other components.

Images captured by the image capture device 170 at step 1002 can be transferred to the computing device 100 over the network 150, using a local wired connection, by hand transfer using a memory stick or device (e.g., a flash-based memory stick or card), or any other suitable means or method. The images captured by the image capture device 170 can be stored locally by the computing device 100 as the image data 122 for further processing.

At step 1004, the process 1000 includes the image registration engine 132 performing a feature-based image registration through a rigid-body transformation to align features of the second image with the first image. The feature-based image registration can be conducted in the manner described above with reference to FIG. 2.

At step 1006, the process 1000 includes the image registration engine 132 performing an intensity-based image registration through a non-rigid transformation to further align features of the second image with the first image. The intensity-based image registration can be conducted in the manner described above with reference to FIG. 3.

At step 1008, the process 1000 includes the registration map generator 134 determining a registration error map based on a comparison of the first image and the second image. The registration error map can be generated in the manner described above with reference to FIGS. 6 and 10, for example. Particularly, to generate the registration error map, the image registration engine 132 can calculate a pixel intensity difference between each pixel in the first image and a corresponding pixel in the second image. Registration errors in the registration error map can be defined as the absolute intensity difference between corresponding pixels among the two images. As one example, pixels with exactly matched intensities can be registered as 0 (e.g., black) in the registration error map, while intensities of unmatched pixels can be registered in the range of 1 to 255 (e.g., from grey to white) in the registration error map, depending on the level of discrepancy.

At step 1010, the process 1000 includes the registration map generator 134 performing edge-aware noise reduction on the registration error map. The edge-aware noise reduction step can be conducted in the manner described above with reference to FIG. 8.

At step 1012, the process 1000 includes the registration map generator 134 conducting a feature enhancement process on the registration error map. The registration map generator 134 can conduct the feature enhancement process to further highlight cracks for detection. As one example, the registration map generator 134 can convert the registration error map from a black-white color spectrum to a white-red color spectrum as the feature enhancement process, so that cracks can be more easily visualized on a display device and identified by individuals.

At step 1014, the process 1000 includes the fatigue crack detector 136 identifying one or more fatigue cracks based on the results provided by the registration map generator 134 in earlier steps. In some cases, the fatigue crack detector 136 can identify, quantify, and qualify fatigue cracks based on the results provided by the registration map generator 134. The fatigue crack detector 136 can analyze the registration maps to determine the size, shape, length, start and end points, and other characteristics of fatigue cracks using image processing techniques in an automated fashion. In some cases, step 1014 can be conducted by an individual with reference to results presented on a display device of the client device 160.

The computing device 100 in FIG. 1 and the process diagram in FIG. 19 show example implementations of the embodiments described herein. The embodiments described herein can be embodied or implemented in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing device 100 can be embodied by one or more processing circuits and memory devices. Such processing circuits and memory devices can include, for example, one or more processors and one or more storage or memory devices coupled to a local interface. The local interface can include, for example, a data bus with an accompanying address/control bus or any other suitable bus structure. Similarly, the client device 160 can include at least one processing circuit. Such a processing circuit can include, for example, one or more processors and one or more storage or memory devices coupled to a local interface.

The storage or memory devices can store data or components that are executable by the processors of the processing circuit. For example, the crack detection engine 130 and/or other components can be stored in one or more storage devices and be executable by one or more processors in the computing device 100. The crack detection engine 130 can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system, such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the crack detection engine 130, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A method for fatigue crack detection, comprising:
capturing a first image of a structure at a first time;
capturing a second image of the structure at a second time;
performing a feature-based image registration through a rigid-body transformation to align features of the second image with the first image;
performing an intensity-based image registration through a non-rigid transformation to further align features of the second image with the first image;
determining a registration error map based on a comparison of the first image and the second image; and
performing edge-aware noise reduction on the registration error map.

2. The method of claim 1, further comprising referencing the registration error map to identify at least one fatigue crack in the structure.

3. The method of claim 1, wherein performing the feature-based image registration comprises:
identifying first features in the first image;
identifying second features in the second image;
identifying at least one feature match between the first features and the second features;
generating a geometric transformation matrix that describes a geometric distortion between the first image and the second image based on the at least one feature match; and
aligning the second image with the first image based on the geometric transformation matrix.

4. The method of claim 1, wherein performing the intensity-based image registration comprises:

generating at least one displacement field that describes the non-rigid transformation between the first image and the second image; and further aligning the second image with the first image based on the at least one displacement field.

5. The method of claim 1, wherein determining the registration error map comprises performing a pixel-by-pixel intensity comparison of the first image and the second image.

6. The method of claim 1, wherein determining the registration error map comprises:
calculating a pixel intensity difference between each pixel in the first image and a corresponding pixel in the second image to generate the registration error map, wherein:
in the registration error map, a black pixel is representative of a zero pixel intensity difference between the pixel in the first image and the corresponding pixel in the second image; and
in the registration error map, a grey pixel is representative of a non-zero pixel intensity difference between the pixel in the first image and the corresponding pixel in the second image.

7. The method of claim 1, further comprising conducting a feature enhancement process on the registration error map.

8. The method of claim 7, wherein conducting the feature enhancement process on the registration error map comprises converting the registration error map from a black-white color spectrum to a white-red color spectrum.

9. The method of claim 1, further comprising:
defining at least one first region of interest in the first image; and
defining at least one second region of interest in the second image, wherein
determining the registration error map comprises determining the registration error map using the at least one first region of interest in the first image and the at least one second region of interest in the second image.

10. A system for fatigue crack detection, comprising:
a memory device comprising memory configured to store computer-readable instructions thereon; and
at least one processing device comprising processing circuitry configured, through execution of the computer-readable instructions, to:
capture a first image of a structure at a first time;
capture a second image of the structure at a second time;
perform a feature-based image registration through a rigid-body transformation to align features of the second image with the first image;
perform an intensity-based image registration through a non-rigid transformation to further align features of the second image with the first image;
determine a registration error map based on a comparison of the first image and the second image; and
perform edge-aware noise reduction on the registration error map.

11. The system of claim 10, wherein the at least one processing device is further configured to reference the registration error map to identify at least one fatigue crack in the structure.

12. The system of claim 10, wherein, to perform the feature-based image registration, the at least one processing device is further configured to:
identify first features in the first image;
identify second features in the second image;
identify at least one feature match between the first features and the second features;
generate a geometric transformation matrix that describes a geometric distortion between the first image and the second image based on the at least one feature match; and
align the second image with the first image based on the geometric transformation matrix.

13. The system of claim 10, wherein, to perform the intensity-based image registration, the at least one processing device is further configured to:
generate at least one displacement field that describes the non-rigid transformation between the first image and the second image; and
further align the second image with the first image based on the at least one displacement field.

14. The system of claim 10, wherein, to determine the registration error map, the at least one processing device is further configured to perform a pixel-by-pixel intensity comparison of the first image and the second image.

15. The system of claim 10, wherein the at least one processing device is further configured to conduct a feature enhancement process on the registration error map.

16. A method for fatigue crack detection, comprising:
performing a feature-based image registration through a rigid-body transformation to align features of a second image with a first image;
performing an intensity-based image registration through a non-rigid transformation to further align features of the second image with the first image;
determining a registration error map based on a comparison of the first image and the second image; and
performing edge-aware noise reduction on the registration error map.

17. The method of claim 16, further comprising referencing the registration error map to identify at least one fatigue crack in the structure.

18. The method of claim 16, wherein performing the feature-based image registration comprises:
identifying first features in the first image;
identifying second features in the second image;
identifying at least one feature match between the first features and the second features;
generating a geometric transformation matrix that describes a geometric distortion between the first image and the second image based on the at least one feature match; and
aligning the second image with the first image based on the geometric transformation matrix.

19. The method of claim 16, wherein performing the intensity-based image registration comprises:
generating at least one displacement field that describes the non-rigid transformation between the first image and the second image; and
further aligning the second image with the first image based on the at least one displacement field.

20. The method of claim 16, wherein determining the registration error map comprises performing a pixel-by-pixel intensity comparison of the first image and the second image.

* * * * *